US012387183B2

(12) United States Patent
Greenbacker et al.

(10) Patent No.: US 12,387,183 B2
(45) Date of Patent: Aug. 12, 2025

(54) ARTIFICIAL INTELLIGENCE (AI) ARCHITECTURE WITH SMART, AUTOMATED TRIGGERS OF INCOMING AND OUTGOING ACTIONS AND USAGE

(71) Applicant: Bank of America Corporation, Charlotte, NC (US)

(72) Inventors: Robertson Walters Greenbacker, Charlotte, NC (US); Heather Roseann Dolan, Sarasota, FL (US); Justin duPont, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 112 days.

(21) Appl. No.: 18/107,170

(22) Filed: Feb. 8, 2023

(65) Prior Publication Data
US 2023/0186260 A1 Jun. 15, 2023

Related U.S. Application Data

(62) Division of application No. 17/153,399, filed on Jan. 20, 2021, now Pat. No. 11,631,067.

(51) Int. Cl.
*G06Q 20/10* (2012.01)
*G06F 18/2411* (2023.01)
*G06N 20/10* (2019.01)
*G06Q 20/42* (2012.01)
*G06Q 40/02* (2023.01)

(52) U.S. Cl.
CPC ....... *G06Q 20/108* (2013.01); *G06F 18/2411* (2023.01); *G06N 20/10* (2019.01); *G06Q 20/425* (2013.01); *G06Q 40/02* (2013.01)

(58) Field of Classification Search
None
See application file for complete search history.

(56) References Cited

U.S. PATENT DOCUMENTS

| 7,899,750 B1 | 3/2011 | Klieman et al. |
| 8,732,076 B2 | 5/2014 | Scipioni et al. |
| 8,774,143 B2 | 7/2014 | Ansari et al. |

(Continued)

FOREIGN PATENT DOCUMENTS

WO 2017/173021 A1 10/2017

OTHER PUBLICATIONS

An Introduction to Support Vector Machines (SVM); https://monkeylearn.com/blog/introduction-to-support-vector-machines-svm/; blog article; downloaded Jan. 20, 2021; 19 pages.

(Continued)

*Primary Examiner* — Matthew S Gart
*Assistant Examiner* — Liz P Nguyen
(74) *Attorney, Agent, or Firm* — Banner & Witcoff, Ltd.

(57) ABSTRACT

Aspects of the disclosure relate to artificial intelligence (AI)-based processing of account transfers between different accounts associated with a client. In particular, various aspects of this disclosure relate to triggering transfers based on data associated with electronic transfers (e.g., between accounts associated with different users) and/or information associated with card-based transactions. Additional aspects of the disclosure relate to using internet of things (IOT) modules to determine predicted consumption associated with utilities, and at least triggering account transfers based on the predicted consumption.

18 Claims, 11 Drawing Sheets

(56) References Cited

U.S. PATENT DOCUMENTS

| | | |
|---|---|---|
| 10,242,019 B1 | 3/2019 | Shan et al. |
| 10,832,251 B1 | 11/2020 | Pike et al. |
| 2005/0021363 A1 | 1/2005 | Stimson et al. |
| 2007/0033134 A1 | 2/2007 | Carretta et al. |
| 2009/0063332 A1 | 3/2009 | Tabaczynski et al. |
| 2014/0172692 A1 | 6/2014 | Tabaczynski et al. |
| 2015/0120564 A1* | 4/2015 | Smith .................. G06Q 20/042 705/45 |
| 2015/0134511 A1 | 5/2015 | Ghosh et al. |
| 2015/0262182 A1 | 9/2015 | Gervais et al. |
| 2017/0124541 A1 | 5/2017 | Aggarwal et al. |
| 2017/0177808 A1 | 6/2017 | Irwin et al. |
| 2019/0087797 A1 | 3/2019 | Ebersole et al. |
| 2019/0087942 A1 | 3/2019 | Ma et al. |
| 2019/0164159 A1 | 5/2019 | Ponniah et al. |
| 2019/0213592 A1 | 7/2019 | Tanaka et al. |
| 2020/0126105 A1 | 4/2020 | Joglekar et al. |
| 2020/0265525 A1* | 8/2020 | Chatman ................ G06Q 40/12 |
| 2020/0380507 A1 | 12/2020 | Kalaboukis |
| 2021/0041855 A1 | 2/2021 | Kursun |
| 2021/0081920 A1 | 3/2021 | Spina et al. |
| 2021/0390539 A1* | 12/2021 | Phillips .............. G06Q 30/0215 |

OTHER PUBLICATIONS

Gimon; What is Pattern Recognition in Machine Learning; https://huspi.com/blog-open/pattern-recognition-in-machine-learning; blog article downloaded Jan. 20, 2021; 16 pages.

MonkeyLearn Text Classification Using Support Vector Machines (SVM); https://monkeylearn.com/text-classification-support-vector-machines-svm/; article downloaded Jan. 20, 2021; 11 pages.

Vigerman; What is Home Automatcion and How Does it Work ?; https://www.security.org/home-automation/; article downloaded Jan. 20, 2021; 1995; 14 pages; security.org.

Smart homes: home automation and the smart home in the age of IoT; https://www.i-scoop.eu/internet-of-things-guide/smart-home-home-automation/; article downloaded Jan. 20, 2021; 15 pages.

* cited by examiner

900

| Trigger Condition | Account Transfer | Transfer Value |
|---|---|---|
| Outgoing transfer with memo word = "rent" | Transfer from checking account to homeownership account | 20% of transfer value |
| Outgoing transfer | Transfer from checking account to recurring expenses account | $2 |
| Incoming transfer with memo word = "rent" | Transfer from checking account to mortgage payment account | $200 |
| Card transaction with MCC code 1 | Transfer from checking account to recurring expenses account | $1 |
| Card transaction with merchant ID1 | Transfer from checking account to homeownership savings account | $10 |
| Card transaction | Transfer from checking account to vacation account | $1 |
| Card transaction at location A | Transfer from checking account to savings account | 2% of transaction value |
| Predicted utility expenses < utility expense account balance | Transfer from utility expense account to checking account | Difference between predicted expenses and utility expense account balance |
| Predicted utility expenses > utility expense account balance | Transfer from checking account to utility expense account | Difference between predicted expenses and utility expense account balance |
| Incoming ACH transfer to checkings account with PPD ID = 12345 | Transfer from checking account to vacation account and recurring expenses account | $50 to vacation account, $100 to recurring expenses account |

Rows labeled: 905, 910, 915, 920, 925, 930, 935, 940, 945, 950

FIG. 9

ARTIFICIAL INTELLIGENCE (AI) ARCHITECTURE WITH SMART, AUTOMATED TRIGGERS OF INCOMING AND OUTGOING ACTIONS AND USAGE

CROSS-REFERENCE TO RELATED APPLICATIONS

This application is a division of U.S. patent application Ser. No. 17/153,399, filed on Jan. 20, 2021, the contents of which is hereby incorporated by reference in its entirety.

BACKGROUND

Consumers sometimes feel that saving money is difficult. Those who earn less or are supporting a family may find it particularly challenging to put money away for emergencies, a child's education, or a special purchase. Even affluent consumers sometimes feel that they should save more money. A consumer can save funds in a bank account by making deposits into the account or by transferring funds from another account. In addition, grandparents or other relatives or friends sometimes desire to contribute money to somebody else's (e.g., a grandchild's) savings account. Various aspects associated with techniques for electronic transaction processing to facilitate savings are discussed in commonly assigned, related U.S. application Ser. No. 17/065,636, filed Dec. 8, 2020, which is herein incorporated by reference in its entirety.

Banks may offer facilities to clients to create multiple accounts, each targeted toward a particular financial or purchase goal, or for recurring expenses. Electronic banking may enable a client to conveniently and almost instantaneously transfer funds between the accounts. However, such transactions may have to be initiated manually by a client. Further, availability of funds, expenses, as well as financial goals may change over time. As a result, it may be difficult for a client to consistently contribute or flexibly modify contributions towards a goal. Therefore, there remains room for technological improvements in systems and methods for automatically facilitating and/or encouraging savings in addition to facilitating account management.

SUMMARY

Aspects of the disclosure provide efficient and flexible technical solutions that address and overcome problems associated with incoming and outgoing transactions between multiple user accounts. Additional aspects of the disclosure relate to using smart utility monitoring devices to process transactions between different user accounts and flexibly adjust utility consumption utility consumption.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes an artificial intelligence (AI) architecture involving a support vector machine (SVM) engine. The AI architecture may comprise a transaction database that may include: a dictionary data store including memo field terms associated with historical electronic fund transfers from a first account associated with a first user to accounts associated with other users, and account transfer information including information associated with historical account transfers from the first account associated with the first user to other accounts associated with the first user. The AI architecture may include an AI model generated by a training engine trained with the dictionary data store and the account transfer information. The AI architecture may also include a server comprising: at least one processor; and a memory storing computer-readable instructions that, when executed by the at least one processor, causes the server to: receive an electronic fund transfer request for a fund transfer from the first account associated with the first user to a second account associated with a second user, where the electronic fund transfer request may include a memo field term; store as a vector in the memory, at least the memo field term; classify the electronic fund transfer request by calculating a decision boundary of the vector using the ai model; based on the classifying, identify a third account associated with the first user; send, to a user computing device associated with the first user, an account transfer notification, where the account transfer notification indicates the third account associated with the first user; receive, from the user computing device, an approval notification; and based on the approval notification, process an account transfer from the first account associated with the user to the third account associated with the first user. Other embodiments of this aspect include corresponding computer systems, apparatus, and computer programs recorded on one or more computer storage devices, each configured to perform the actions of the methods.

Implementations may include one or more of the following features. The training engine may include a support vector machine (SVM). The training engine may include a pattern recognition engine. The information associated with historical account transfers may include an indication of source accounts, destination accounts, and transfer values associated with the historical account transfers. The computer-readable instructions when executed by the at least one processor may cause the server to determine the third account by causing determining the third account further based on an identifier associated with the third account. The identifier may be an account name of the third account. The computer-readable instructions when executed by the at least one processor may cause the server to send the account transfer notification based on determining that a value of funds in the first account associated with the first user exceeds a threshold value. The dictionary data store may further include memo field terms associated with other historical electronic fund transfers from accounts associated with users different from the first user. The account transfer information may further include information associated with historical account transfers associated with users different from the first user. Implementations of the described techniques may include hardware, a method or process, or computer software on a computer-accessible medium.

One general aspect may include an AI architecture comprising a transaction database, a training engine, and a server. The transaction database may include: information associated with historical outgoing payments from a first account associated with a first user, and information associated with historical account transfers from the first account associated with the first user to other accounts associated with the first user. The training engine may be configured to train an AI model using the information associated with the historical outgoing payments and the information associated with historical account transfers. The server may include: at least one processor; and a memory storing computer-readable instructions that, when executed by the at least one processor, cause the server to: receive a transaction indication for an outgoing payment from the first account associated with the first user, where the transaction indication may include one or more attributes; based on the one or more attributes and the AI model, determine a second account associated with the first user; send, to a user computing device, an account transfer notification, where the account transfer notification indicates the second account associated with the first user; receive, from the user computing device, an approval notification; and based on the approval notification, process an account transfer from the first account associated with the user to the second account associated with the user. Other embodiments of this aspect include corresponding computer systems, apparatus, and computer programs recorded on one or more computer storage devices, each configured to perform the actions of the methods.

Implementations may include one or more of the following features. The historical outgoing payments may be historical electronic fund transfers from the first account associated with the first user to accounts associated with other users. The information associated with historical outgoing payments may include a dictionary data store comprising memo field terms associated with the historical electronic fund transfer requests. The training engine may include a support vector machine (SVM). The training engine may include a pattern recognition engine. The transaction indication may be an electronic fund transfer request, received from the user computing device, for an electronic fund transfer from the first account associated with the first user to a third account associated with a second user. The one or more attributes may include terms used in a memo field associated with the electronic fund transfer request. The historical outgoing payments may correspond to card-based transactions, where the information associated with the historical outgoing payments may include at least one selected from: merchant category codes (MCCs) associated with the card-based transactions; merchant identifiers associated with the card-based transactions; locations associated with the card-based transactions; and combination thereof. The transaction indication may be an indication corresponding to a card-based transaction, and where the one or more attributes may include at least one selected from: an MCC associated with the card-based transaction; a merchant identifier associated with card-based transaction; a location associated with the card-based transaction; and combination thereof. The information associated with historical account transfers may include an indication of source accounts, destination accounts, and transfer values associated with the historical account transfers. Implementations of the described techniques may include hardware, a method or process, or computer software on a computer-accessible medium.

One general aspect includes a computing platform for processing account transfers between financial accounts associated with a first user. The computing platform also includes at least one processor. The platform also includes a memory storing computer-readable instructions that, when executed by the at least one processor, cause the computing platform to: receive an electronic fund transfer request for a fund transfer from a first account associated with a first user to a second account associated with a second user, where the electronic fund transfer request may include a memo field term; determine, based on the memo field term, a third account associated with the first user; send, to a user computing device, an account transfer notification, where the account transfer notification indicates the third account associated with the first user; receive, from the user computing device, an approval notification; and based on the approval notification, process a transfer of funds from the first account associated with the first user to the third account associated with the first user. Other embodiments of this aspect include corresponding computer systems, apparatus, and computer programs recorded on one or more computer storage devices, each configured to perform the actions of the methods.

Implementations may include one or more of the following features. The memory may store a transaction database comprising: a dictionary data store including memo field terms associated with historical electronic fund transfers from the first account associated with a first user to accounts associated with other users; and account transfer information including information associated with historical account transfers from the first account associated with the first user to other accounts associated with the first user. The computer-readable instructions when executed by the at least one processor may cause the computing platform to determine the third account associated with the first user by causing determining the third account further based on an artificial intelligence (AI) model; where the ai model is trained with the dictionary data store and the account transfer information. The AI model is trained with a training engine comprising a support vector machine (SVM). The computer-readable instructions when executed by the at least one processor may cause the computing platform to send the account transfer notification based on determining that a value of funds in the first account associated with the first user exceeds a threshold value. Implementations of the described techniques may include hardware, a method or process, or computer software on a computer-accessible medium.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes an artificial intelligence (AI) architecture involving a support vector machine (SVM) engine. The AI architecture may comprise a transaction database, an AI model, and a server. The transaction database may include: a dictionary data store including memo field terms associated with historical electronic fund transfers to a first account associated with a first user from accounts associated with other users, and account transfer information including information associated with historical account transfers from the first account associated with the first user to other accounts associated with the first user. The AI model may be generated by a training engine trained with the dictionary data store and the account transfer information. The server may include: at least one processor; and a memory storing computer-readable instructions that, when executed by the at least one processor, cause the server to: receive an incoming electronic fund transfer to the first account associated with the first user from a second account associated with a second user, where the incoming electronic fund transfer may include a memo field term; storing as a vector in the memory, at least the memo field term; classify the incoming electronic fund transfer by calculating a decision boundary of the vector using the AI model; based on the classifying, identify a third account associated with the first user; send, to a user computing device associated with the first user, an account transfer notification, where the account transfer notification indicates the third account associated with the first user; receive, from the user computing device, an approval notification; and based on the approval notification, process an account transfer from the first account associated with the user to the third account associated with the first user. Other embodiments of this aspect include corresponding computer systems, apparatus, and computer programs recorded on one or more computer storage devices, each configured to perform the actions of the methods.

Implementations may include one or more of the following features. The training engine may include a support vector machine (SVM). The training engine may include a pattern recognition engine. The information associated with historical account transfers may include an indication of source accounts, destination accounts, and transfer values associated with the historical account transfers. The computer-readable instructions when executed by the at least one processor may cause the server to determine the third account by causing determining the third account further based on an identifier associated with the third account. The identifier may be an account name of the third account. The computer-readable instructions when executed by the at least one processor may cause the server to send the account transfer notification based on determining that a value of funds in the first account associated with the first user exceeds a threshold value. The dictionary data store further may include memo field terms associated with other historical electronic fund transfers from accounts associated with users different from the first user; and the account transfer information further may include information associated with historical account transfers associated with users different from the first user. Implementations of the described techniques may include hardware, a method or process, or computer software on a computer-accessible medium.

One general aspect may include an artificial intelligence (AI) architecture comprising a transaction database, a training engine, and a server. The transaction database may include: information associated with historical incoming payments to a first account associated with a first user, and information associated with historical account transfers from the first account associated with the first user to other accounts associated with the first user. The training engine configured to train an AI model using the information associated with the historical incoming payments and the account transfer information. The server may include: at least one processor; and a memory storing computer-readable instructions that, when executed by the at least one processor, cause the server to: receive a transaction indication for an incoming payment to the first account associated with the first user, where the transaction indication may include one or more attributes; based on the one or more attributes and the AI model, determine a second account associated with the first user; send, to a user computing device, an account transfer notification, where the account transfer notification indicates the second account associated with the first user; receive, from the user computing device, an approval notification; and based on the approval notification, process an account transfer from the first account associated with the user to the second account associated with the user. Other embodiments of this aspect include corresponding computer systems, apparatus, and computer programs recorded on one or more computer storage devices, each configured to perform the actions of the methods.

Implementations may include one or more of the following features. The historical incoming payments may be historical electronic fund transfers to the first account associated with the first user from accounts associated with other users. The information associated with historical incoming payments may include a dictionary data store comprising memo field terms associated with the historical electronic fund transfer requests. The training engine may include a support vector machine (SVM). The training engine may include a pattern recognition engine. The transaction indication may be an electronic fund transfer request for an electronic fund transfer to the first account associated with the first user from a third account associated with a second user. The one or more attributes may include terms used in a memo field associated with the electronic fund transfer request. The information associated with historical account transfers may include an indication of source accounts, destination accounts, and transfer values associated with the historical account transfers. Implementations of the described techniques may include hardware, a method or process, or computer software on a computer-accessible medium.

One general aspect may include a computing platform for processing account transfers between financial accounts associated with a user. The computing platform may include at least one processor. The platform may also includes a memory storing computer-readable instructions that, when executed by the at least one processor, cause the computing platform to: receive an incoming electronic fund transfer to a first account associated with a first user from a second account associated with a second user, where the incoming electronic fund transfer may include a memo field term; determine, based on the memo field term, a third account associated with the first user; send, to a user computing device, an account transfer notification, where the account transfer notification indicates the third account associated with the first user; receive, from the user computing device, an approval notification; and based on the approval notification, process a transfer of funds from the first account associated with the first user to the third account associated with the first user. Other embodiments of this aspect include corresponding computer systems, apparatus, and computer programs recorded on one or more computer storage devices, each configured to perform the actions of the methods.

Implementations may include one or more of the following features. The memory may store a transaction database comprising: a dictionary data store including memo field terms associated with historical electronic fund transfers to the first account associated with a first user from accounts associated with other users; and account transfer information comprising information associated with historical account transfers from the first account associated with the first user to other accounts associated with the first user. The computer-readable instructions when executed by the at least one processor may cause the computing platform to determine the third account associated with the first user by causing determining the third account further based on an artificial intelligence (AI) model trained based on the dictionary data store and the account transfer information. The dictionary data store further may include memo field terms associated with other historical electronic fund transfers to accounts associated with users different from the first user; and the account transfer information further may include information associated with historical account transfers associated with users different from the first user. The AI model may be trained using a support vector machine (SVM). The computer-readable instructions when executed by the at least one processor may cause the computing platform to send the account transfer notification based on determining that a value of funds in the first account associated with the first user exceeds a threshold value. Implementations of the described techniques may include hardware, a method or process, or computer software on a computer-accessible medium.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system for intelligent management of electricity consumption at a residential premises. The system may include an internet-of-things (IOT) module configured to be installed in the residential premises and configured to determine and control consumption associated with electricity consumed at the residential premises. The system may also include a user computing device; and a server. The server may include: at least one processor; and a memory storing computer-readable instructions that, when executed by the at least one processor, cause the server to: receive, from the IOT module, an electricity usage notification, where the electricity usage notification may indicate a usage level associated with the electricity for a first time period; predict, based on the usage level, an expected total usage level of the electricity for a second time period that may include the first time period; determine, based on the expected total usage level for the second time period, an expected electricity cost for the second time period; determine a balance of funds available in a first account associated with the electricity; based on the expected electricity cost exceeding the balance of funds available in the first account, send a notification to the user computing device, where the notification may indicate: a request for transfer of funds from a second account to the first account; and an indication for adjusting operation of the IOT module; receive, from the user computing device, an approval notification; and based on the approval notification, process a transfer of funds from the second account to the first account. Other embodiments of this aspect include corresponding computer systems, apparatus, and computer programs recorded on one or more computer storage devices, each configured to perform the actions of the methods.

Implementations may include one or more of the following features. The user computing device may include: at least one second processor; and a second memory storing second computer-readable instructions that, when executed by the at least one second processor, cause the user computing device to: receive the indication for adjusting operation of the IOT module; and sending, to the IOT module, a notification to switch operation of the IOT module to an electricity savings mode. The second computer-readable instructions when executed by the at least one second processor, may cause the computing device to: display, via a graphical user interface (GUI), a notification for adjusting operation of the IOT module, where the sending the notification to switch operation of the IOT module to the electricity savings mode may be based on receiving user input via the GUI. The computer-readable instructions when executed by the at least one processor may cause the server to send, based on the approval notification and to the IOT module, a notification to switch operation of the IOT module to an electricity savings mode. The IOT module may be a smart thermostat. The electricity usage notification may indicate temperature settings used for the smart thermostat during the first time period. The approval notification may indicate a balance of the funds to be transferred between the first account and the second account. The first account and the second account may be associated with a first user, where the computer-readable instructions when executed by the at least one processor cause the server to: receive an electronic fund transfer request for a fund transfer from the second account associated with the first user to a third account associated with a second user, where the electronic fund transfer request may include a memo field term; and based on the memo field term, process a second transfer of funds from the second account to the first account. The computer-readable instructions when executed by the at least one processor may cause the server to determine the first account associated with the electricity based on an account name corresponding to the first account. The computer-readable instructions when executed by the at least one processor cause the server to predict an expected total usage level of the electricity for the second time period by causing determining usage levels of the electricity for a plurality of time periods prior to the first time period. Implementations of the described techniques may include hardware, a method or process, or computer software on a computer-accessible medium.

One general aspect includes a method for intelligent management of utility consumption. The method may include receiving, from an internet of things (IOT) module, a utility usage notification, where the utility usage notification may indicate a usage level associated with a utility for a first time period. The method also includes predicting, based on the usage level, an expected total usage level of the utility for a second time period that may include the first time period. The method also includes determining, based on the expected total usage level for the second time period, an expected utility cost for the second time period. The method also includes determining a balance of funds available in a first account associated with the utility. The method also includes based on the expected utility cost exceeding the balance of funds available in the first account, sending a notification to the user computing device, where the notification indicates: a request for transfer of funds from a second account to the first account, and an indication for adjusting operation of the IOT module. The method also includes receiving, from the user computing device, an approval notification. The method also includes based on the approval notification, processing a transfer of funds from the second account to the first account. Other embodiments of this aspect include corresponding computer systems, apparatus, and computer programs recorded on one or more computer storage devices, each configured to perform the actions of the methods.

Implementations may include one or more of the following features. The method may include sending, based on the approval notification and to the IOT module, a notification to switch operation of the IOT module to a utility savings mode. The IOT module may be a smart thermostat. The utility usage notification may indicate temperature settings used for the smart thermostat during the first time period. The approval notification may indicate a balance of the funds to be transferred between the first account and the second account. The first account and the second account may be associated with a first user, where the method further may include: receiving an electronic fund transfer request for a fund transfer from the second account associated with the first user to a third account associated with a second user, where the electronic fund transfer request may include a memo field term; and based on the memo field term, processing a second transfer of funds from the second account to the first account. The method may include determining the first account associated with the utility based on an account name corresponding to the first account. Implementations of the described techniques may include hardware, a method or process, or computer software on a computer-accessible medium.

One general aspect includes a non-transitory computer readable medium storing instructions that, when executed, cause receiving, from an internet of things (IOT) module, a utility usage notification, where the utility usage notification indicates a usage level associated with a utility for a first time period; predicting, based on the usage level, an expected total usage level of the utility for a second time period that may include the first time period; determining, based on the expected total usage level for the second time period, an expected utility cost for the second time period; determining a value of funds available in a first account associated with the utility; based on the expected utility cost exceeding the value of funds available in the first account, sending a notification to the user computing device, where the notification indicates: a request for transfer of funds from a second account to the first account, and an indication for adjusting operation of the IOT module; receiving, from the user computing device, an approval notification; and based on the approval notification, processing a transfer of funds from the second account to the first account. Other embodiments of this aspect include corresponding computer systems, apparatus, and computer programs recorded on one or more computer storage devices, each configured to perform the actions of the methods.

Implementations may include one or more of the following features. The non-transitory computer readable medium where the instructions, when executed, cause sending, based on the approval notification and to the IOT module, a notification to switch operation of the IOT module to a utility savings mode. The first account and the second account may be associated with a first user, and where the instructions, when executed, cause: receiving an electronic fund transfer request for a fund transfer from the second account associated with the first user to a third account associated with a second user, where the electronic fund transfer request may include a memo field term; and based on the memo field term, process a second transfer of funds from the second account to the first account. Implementations of the described techniques may include hardware, a method or process, or computer software on a computer-accessible medium.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 9 illustrates an example table indicating a set of rules for processing transfers between different accounts associated with a client, in accordance with one or more example arrangements.

DETAILED DESCRIPTION

Figure 1A:
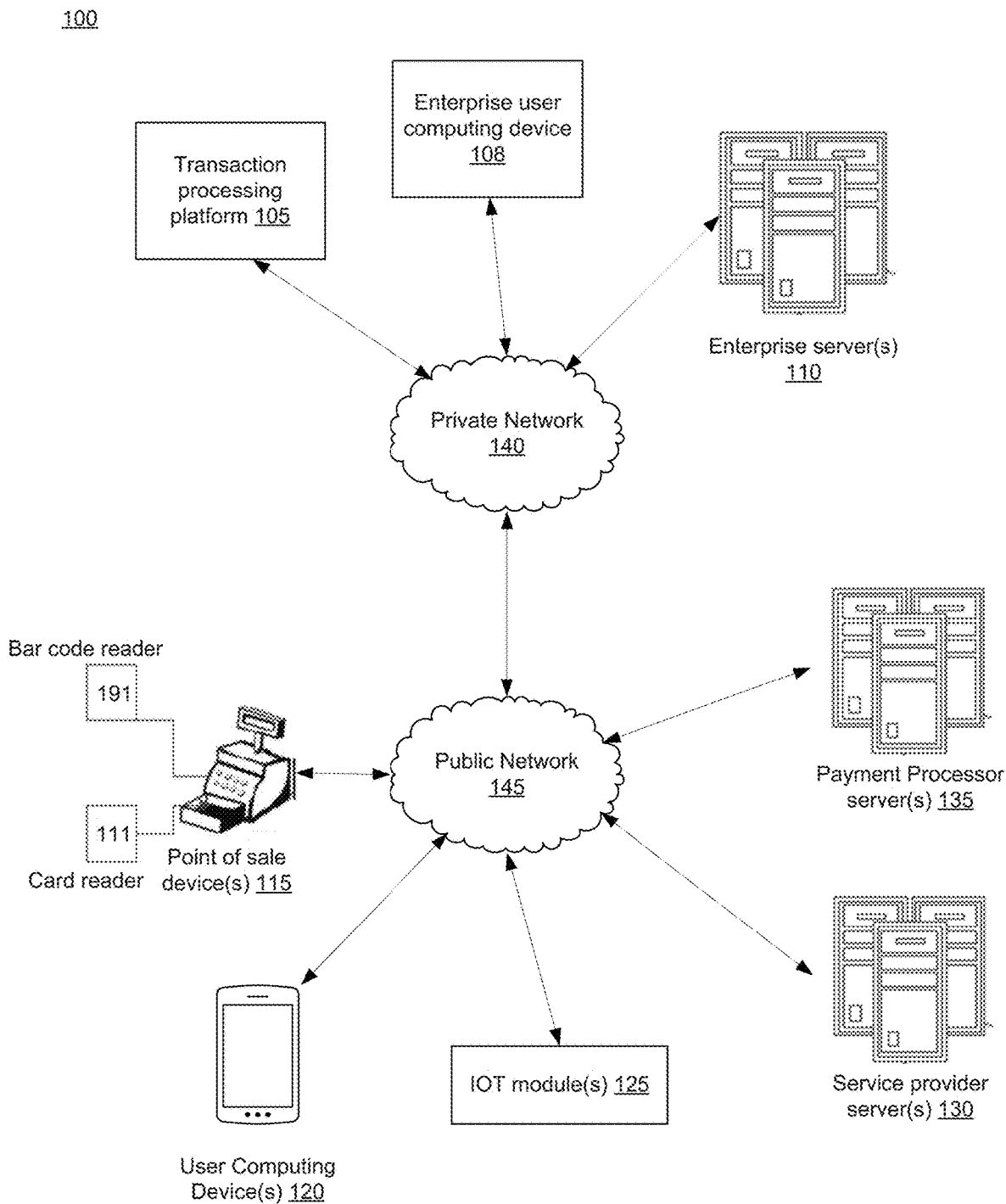
FIG. 1A illustrates an example of a suitable computing environment, in accordance with one or more example arrangements.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. It is noted that various connections between elements are discussed in the following description. It is noted that these connections are general and, unless specified otherwise, may be direct or indirect, wired or wireless, and that the specification is not intended to be limiting in this respect.

Aspects of the disclosure generally relate to an innovative network architecture that enables the seamless connectivity of an automated savings program to an existing network of transactional systems. In one embodiment, the transactional system may comprise a plurality of homogenous computer systems belonging to a single entity. In other embodiments, the transactional system may comprise heterogeneous computer systems belonging to a plurality of entities. The seamless connectivity may permit universal sign-on and/or enrollment to an automatic savings program. The connectivity is seamless, in some embodiments, because an existing transactional system might not natively include an automatic savings program, but the innovative network architecture enables a computer server configured with an automatic savings program to interface with the existing transactional system. In one embodiment, the interface may be through a web service that integrates into an existing network of transactional system. In another embodiment, the interface may be through overloading of method calls of objects in an existing transactional system. The transactional systems may comprise an online banking system, an online billpay network, a person-to-person payment network, a debit network, a credit network, digital wallet, a cypto-currency network, and/or any other payment network.

In accordance with various aspects of the disclosure, a method and system for enhanced automated transfers between different accounts based on various trigger events is disclosed. In one embodiment, computer implemented systems and methods are disclosed for processing a financial transaction that may include determining a transfer amount, determining accounts associated with transfers, determining trigger events and rules associated with transfers, etc. In accordance with various aspects of the disclosure, a method and system for enhanced transfers between different accounts based on projected expenses is disclosed. The system includes computing systems that may determine projected expenses based on input from one or more sensors and/or systems associated with various service providers (e.g., utility companies). The system includes computing systems that operate to process transactions associated with various types of accounts. Examples of such accounts may include a checking account, a savings account, a merchant account, and investment account, and one or more computer systems and mobile devices including a communication interface, processor, memory storing computer-executable instructions, and savings modules. In one embodiment, a computer implemented savings program may automatically generate a monetary amount (e.g., a savings amount) and deposits the savings amount in the user's account; thereby enabling the user to accumulate savings and be prepared for upcoming expenses conveniently and painlessly.

FIG. 1A illustrates an example of a suitable computing environment 100, in accordance with one or more example arrangements. The computing environment 100 is only one example of a suitable computing environment and is not intended to suggest any limitation as to the scope of use or functionality of the disclosure. The computing environment 100 should not be interpreted as having any dependency or requirement relating to any one or combination of components illustrated in the exemplary computing environment 100.

The disclosure is operational with numerous computing system environments or configurations. Examples of computing systems, environments, and/or configurations that may be suitable for use with the disclosure include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like that have been programmed with particular instructions to carry out one or more of the functional aspects described in further detail below either individually or in conjunction with one another.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices.

With reference to FIG. 1A, computer implemented systems for processing enhanced automatic savings and electronic fund transfers is shown. The computing environment 100 may comprise one or more devices (e.g., computer systems, communication devices, and the like). The computing environment 100 may comprise, for example, a transaction processing platform 105, enterprise user computing device 108, enterprise server(s) 110, point of sale device(s) 115, user computing device(s) 120, internet of things (IOT) module(s) 125, service provider server(s) 130, payment processor server(s) 135, etc. The devices/systems in the computing environment 100 may communicate via one or more communication networks (e.g., private network 140, public network 145, etc.). The private network 140 and/or one or more devices connected via the private network 140 may correspond to an enterprise organization (e.g., financial institution, such as a bank) providing services associated with automated savings and electronic transfers in accordance to various examples described herein. One or more of the devices and/or systems (e.g., the transaction processing platform 105, the enterprise user computing device 108, and the enterprise server(s) 110) may be linked via the private network 140. Other devices in the computing environment (e.g., point of sale device(s) 115, user computing device(s) 120, IOT module(s) 125, service provider server(s) 130, payment processor server(s) 135, etc.) may communicate, via a public network 145, with the devices/systems in the private network 140.

The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular communication protocol, a hypertext transfer protocol (HTTP), etc.). For example, the private network may correspond to a LAN network or a WIFI network, and the public network may correspond to a wide area network (WAN) (e.g., internet).

The transaction processing platform 105 may be used for various financial transactions within the computing environment 100. The transaction processing platform 105 may comprise modules that may facilitate electronic fund transfers between different accounts (e.g., within the same financial institution or associated with different financial institutions). The transaction processing platform 105 may comprise modules that may be used to approve card-based transactions (e.g., credit card or debit card transactions). The transaction processing platform 105 may comprise modules that may be used by a client to transfer funds between different accounts associated with the client.

As illustrated in greater detail below, the transaction processing platform 105 may comprise one or more computing devices configured to perform one or more of the functions described herein. For example, the transaction processing platform 105 may comprise one or more computers (e.g., laptop computers, desktop computers, servers, server blades, or the like). The transaction processing platform 105 may comprise one or more processors for controlling overall operation of the transaction processing platform 105 and its associated components, including memory and communication modules. The transaction processing platform 105 may include a variety of computer readable media. Computer readable media may be any available media that may be accessed by computing device 105 and include both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 105. Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. Additional details related to components of the transaction processing platform 105 are provided with reference to FIG. 1B.

The enterprise user computing device 108 may be a personal computing device (e.g., desktop computer, laptop computer) or mobile computing device (e.g., smartphone, tablet). In addition, the enterprise user computing device 108 may be linked to and/or operated by a specific enterprise user (who may, e.g., be an employee or other affiliate of an enterprise organization operating the transaction processing platform 105).

The enterprise server(s) 110 may comprise application server(s) and/or database server(s). The application server(s) may comprise one or more computing devices and/or other computer components (e.g., processors, memories, communication interfaces). The application server(s) may be configured to host, execute, and/or otherwise provide one or more enterprise applications. For example, the application server(s) may be configured to host, execute, and/or otherwise provide one or more transaction processing programs, such as an online banking applications, loan application processing applications, and/or other applications. In addition, the application server(s) may process and/or otherwise execute transactions on specific accounts based on commands and/or other information received from other computer systems comprising the computing environment 100. In some instances, the application server(s) may be configured to provide various enterprise and/or back-office computing functions.

The database server(s) may comprise one or more computing devices and/or other computer components (e.g., processors, memories, communication interfaces). The database server(s) may be used to store, modify, and/or retrieve information for one or more enterprise applications and/or users/clients associated with the financial institution. The database server(s) may comprise various servers and/or databases that store and/or otherwise maintain information that may be used by applications hosted and executed by the application server(s). With reference to the example where the private network 140 may be associated with a financial institution, the database server(s) may store and/or otherwise maintain account information, such as financial account information including account balances, transaction history, account owner information, and/or other information for clients.

The POS device 115 may be an electronic cash register or a computing devices (e.g., desktop computer, tablets, smartphones, etc.) that may be used to process a transaction using a credit card, debit card, or near-field communication (NFC) devices (e.g., a smartphone or a smartwatch enabled with NFC communication capabilities). The POS device 115 may include a barcode reader 192 that may be used to read barcodes on products and to automatically enter the products and prices into the POS device 115. The POS device may further include a card reader 111 that may read account information from a credit card, debit card, or any other type of financial device that can be used to purchase an item. The POS device 115 may include other devices, such as a keypad, that can also be used to read account information for facilitating a transaction. The POS device may include an NFC module that may communicate with other NFC devices to process transactions. For example, the user computing device 120 (e.g., a smartphone, a tablet, a smartwatch, etc.) may be enabled to communicate with the NFC module to initiate a payment. In one embodiment, the POS device 115 may be located at a retailer.

The user computing device 120 may be any computing device (e.g., a desktop computer, a laptop computer, a smartphone, a smartwatch, a tablet, etc.). A client associated with the financial institution may use the user computing device to perform various account management functions (e.g., check account balances, perform electronic transfers, configure automated savings, pay bills, etc.) via applications hosted on the enterprise server(s) 110. For example, the user computing device 120 may be used to access on online portal (e.g., a website) associated with the financial institution to perform account management functions. As another example, the user computing device 120 may be a smartphone or a tablet with an application, associated with the financial institution, enabling a client to perform account management functions.

The IOT module 125 may be correspond to smart devices that may determine/estimate, in real-time, usage of various services by a client. For example, the IOT module 125 may be smart home appliances (e.g., smart thermostats, home assistant devices, etc.) that may determine/estimate utility consumption (e.g., electricity consumption, gas consumption, etc.) and indicate the same to the transaction processing platform 105 and/or the service provider server(s) 130. Alternatively, or additionally, the IOT module 125 may determine/estimate an estimated cost associated with the utility consumption and indicate the same to the transaction processing platform 105 and/or the service provider server(s).

The service provider server(s) 130 may comprise one or more computing devices and/or other computer components (e.g., processors, memories, communication interfaces). The service provider servers 130 may be associated with utility service providers (e.g., gas, electricity, water services provider, etc.) and may track usage associated with utilities provided to clients. For example, the service provider server(s) 130 may store/track, in a database, real-time consumption (or costs associated with the consumption) of a particular utility by clients. The service provider server(s) 130 may determine real-time consumption based on information provided by the IOT module(s) 125. In another example, the service provider servers 130 may be associated with enterprises providing other types of services (e.g., subscription-based online audio/video streaming services, cable television services, telephony services, etc.). The service provider server(s) 130 may provide/send, to the transaction processing platform 105, billing/payment information associated with various utilities, subscriptions, and/or other services provided to clients.

The payment processor server(s) 135 may comprise one or more computing devices and/or other computer components (e.g., processors, memories, communication interfaces). The payment processor server(s) 135 may be associated with a card network and may communicate with enterprise server(s) 110 to process a card-based transaction. The card-based transaction may be via the POS device(s) 115 or via website-based online interfaces (e.g., associated with online shopping portals, or bill payment interfaces, etc.). The payment processing server(s) 135 may receive a request for a card-based transaction (e.g., when a user uses a credit/debit card at the POS device(s) 115 or an online interface) and forward information associated with the transaction to the enterprise server(s) 11 and/or the transaction processing platform 105. For example, the payment processor server(s) 135 may receive (e.g., from POS device(s) 115) and subsequently indicate, to the transaction processing platform 105, a merchant category code (MCC) associated with the transaction, a merchant identifier (ID) associated with the transaction, a transaction value, credit card/debit card information (e.g., card number, CVV), etc.

In one or more arrangements, the transaction processing platform 105, the enterprise server(s) 110, the POS device(s) 115, the user computing device(s) 120, the IOT module(s) 125, the service provider server(s) 130, the payment processor server(s) 135, and/or the other systems in the computing environment 100 may be any type of computing device capable of receiving input via the user interface, and communicating the received input to one or more other computing devices. For example, the transaction processing platform 105, the enterprise server(s) 110, the POS device(s) 115, the user computing device(s) 120, the IOT module(s) 125, the service provider server(s) 130, the payment processor server(s) 135 may, in some instances, be and/or include server computers, desktop computers, laptop computers, tablet computers, smart phones, wearable devices, or the like that may comprised of one or more processors, memories, communication interfaces, storage devices, and/or other components. In one or more arrangements, the transaction processing platform 105, the enterprise server(s) 110, the POS device(s) 115, the user computing device(s) 120, the IOT module(s) 125, the service provider server(s) 130, the payment processor server(s) 135, and/or other systems included in the computing environment 100 may be any type of display device, audio system, wearable devices (e.g., a smart watch, fitness tracker, etc.). Any and/or all of the transaction processing platform 105, the enterprise server(s) 110, the POS device(s) 115, the user computing device(s) 120, the IOT module(s) 125, the service provider server(s) 130, the payment processor server(s) 135 may be special-purpose computing devices configured to perform specific functions.

Figure 1B:
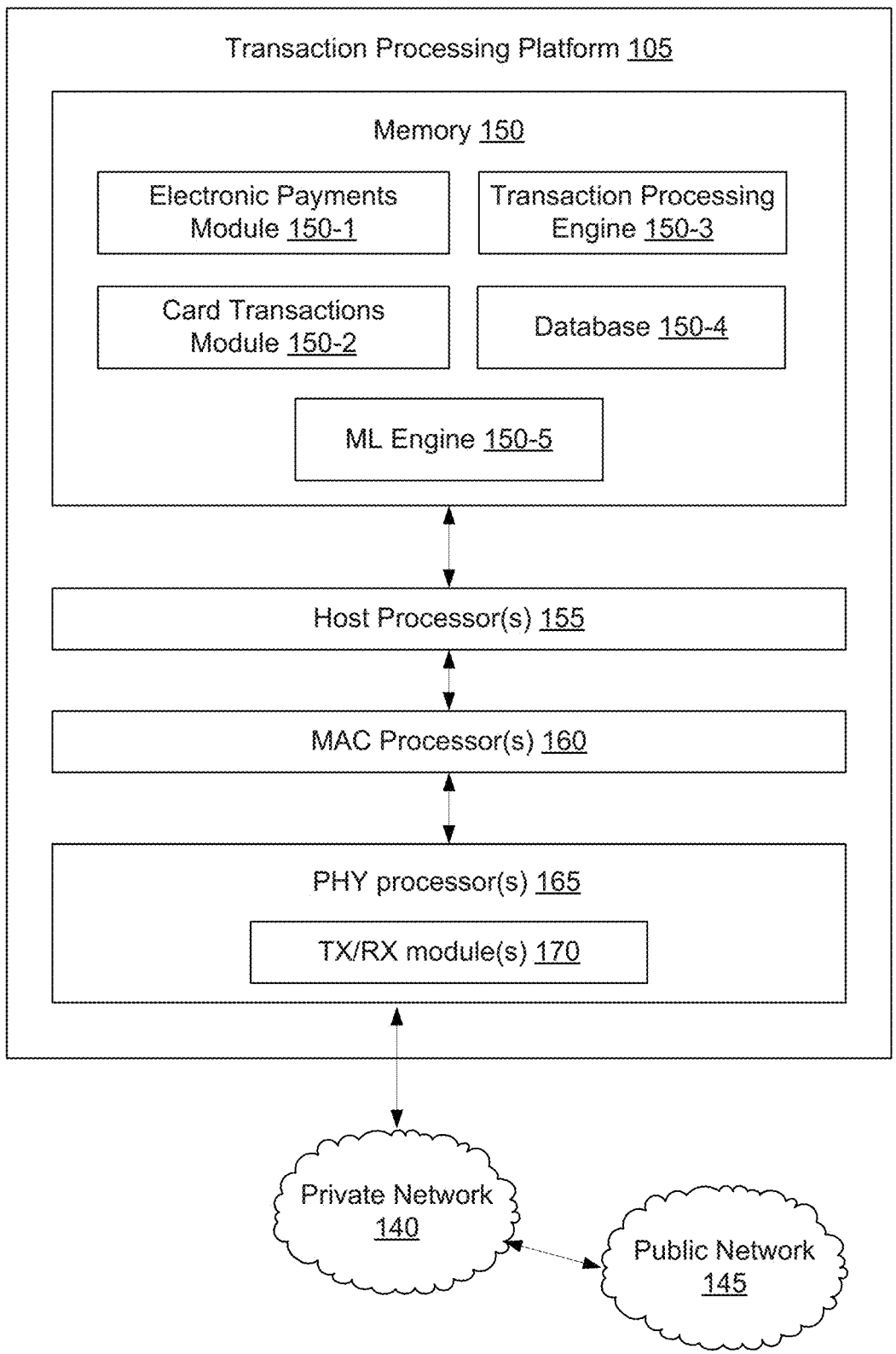
FIG. 1B illustrates additional details related to a transaction processing platform, in accordance with one or more example arrangements.

FIG. 1B illustrates additional details related to the transaction processing platform 105, in accordance with one or more example arrangements. The transaction processing platform 105 may comprise one or more computing devices/servers and/or other computer components (e.g., processors, memories, communication interfaces). The transaction processing platform 105 may comprise one or more of host processor(s) 155, medium transaction control (MAC) processor(s) 160, physical layer (PHY) processor(s) 165, transmit/receive (TX/RX) module(s) 170, memory 150, and/or the like. One or more data buses may interconnect host processor(s) 155, MAC processor(s) 160, PHY processor(s) 165, Tx/Rx module(s) 170, and/or memory 150. The transaction processing platform 105 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. Memory 150 may be any memory such as a RAM, a ROM, a flash memory, or any other electronically readable memory as described above.

Messages transmitted from and received at devices in the computing environment 100 may be encoded in one or more MAC data units and/or PHY data units. For example, the MAC processor(s) 160 and/or the PHY processor(s) 165 of the transaction processing platform 105 are configured to generate data units, and process received data units, that conform to any suitable wired and/or wireless communication protocol. For example, the MAC processor(s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165. The PHY processor(s) 165 may, for example, generate PHY data units (e.g., PHY protocol data units (PPDUs)) based on the MAC data units. The generated PHY data units may be transmitted via the TX/RX module(s) 170 over the private network 140 and/or the public network 145. Similarly, the PHY processor(s) 165 may receive PHY data units from the TX/RX module(s) 170, extract MAC data units encapsulated within the PHY data units, and forward the extracted MAC data units to the MAC processor(s) 160. The MAC processor(s) 512 may then process the MAC data units as forwarded by the PHY processor(s) 514.

One or more processors (e.g., the host processor(s) 155, the MAC processor(s) 160, the PHY processor(s) 165, and/or the like) of the transaction processing platform 105 may be configured to execute machine readable instructions stored in memory 150. The memory 150 may comprise (i) one or more program modules/engines having instructions that when executed by the one or more processors cause the transaction processing platform 105 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the transaction processing platform 105 and/or by different computing devices that may form and/or otherwise make up the transaction processing platform 105. For example, memory 150 may have, store, and/or comprise an electronics payment module 150-1, a card transactions module 150-2, a transaction processing engine 150-3, a database 150-4, a machine learning (ML) engine 150-5 and/or the like.

The electronic payments module 150-1 may be associated with a digital payments network that may facilitate electronic fund transfers. The electronic payments module 150-1 may have instructions that direct and/or cause the transaction processing platform 105 to process electronic fund transfers between different accounts. For example, an electronic fund transfer request (e.g., received from the user computing device 120) may indicate a transaction value, a source account, a destination account, a memo field, a date/time of transaction, etc. The source account and the destination account may be associated with a same financial institution or different financial institutions. Some digital payments networks may allow the use of other information to indicate a destination user account (e.g., an email address, cellphone number, etc.). The digital payments networks may allow near instantaneous processing of a transfer between the source account and the destination account. Fund transfers may then be finalized using an automatic clearing house (ACH) transfer. The transaction processing platform 105 may process the transaction and store the information indicated by the electronic fund transfer request in the database 150-4.

The card transactions module 150-2 may be associated with a card network and may comprise instructions that direct and/or cause the transaction processing platform 105 to receive, process, and/or store information related to card transactions (e.g., from the payment processor server(s) 135). The card transactions module 150-2 may receive (e.g., from the payment processor server(s) 135 or the POS device(s) 115) an MCC associated with a transaction, a merchant identifier (ID) associated with the transaction, a transaction value, credit card/debit card information (e.g., card number, card verification value (CVV)), etc. The card transactions module 150-2 may subsequently process the card transaction (e.g., approve the card transaction) and store the card transaction information to the database 150-4. For example, the card transactions module 150-2 may receive debit card information from a POS device 115 and check whether an account associated with the debit card has sufficient balance. If the account has sufficient balance, the card transactions module 150-2 may approve the transaction and send an approval indication to the POS device 115. As another example, the card transactions module 150-2 may receive credit card information from a payment processor server 135 and check whether an account associated with the credit card has sufficient credit to process the transaction. If the account has sufficient credit, the card transactions module 150-2 may approve the transaction and send an approval indication to the payment processor server 135.

Each client may be associated with one or more accounts. For example, a client may be associated with a checking account and one or more savings account. Clients may configure multiple accounts (e.g., via an application or a portal configured via/operating on the application server(s)) using the user computing device(s) 120. Further, each account may be identified by an account name and be configured with a specific goal. For example, a client may configure a "homeownership" account for savings towards a home purchase, a "recurring expenses" account for managing recurring payments for subscriptions/services, a "vacation" account for savings towards a vacation, a "vehicle" account for savings towards a vehicle purchase, etc. The client may configure savings goals (e.g., a dollar value) for each of the configured accounts. Database server(s) and/or the databases 150-4 may maintain information corresponding to accounts associated with clients. As further described herein, the transaction processing platform 105 may facilitate account transfers between different accounts held by a client based on various trigger conditions. Trigger events may correspond to electronic fund transfers, transactions using credit/debit cards, predicted expenses, etc.

The transaction processing engine 150-3 may be used to process account transfers between different accounts associated with a client. For example, the transaction processing engine 150-3 may move funds between a checking account and a homeownership savings account based on instructions received from the user computing device 120. As further described herein, the ML engine 150-5 may also determine/initiate account transfers between different accounts corresponding to a client (e.g., based on an AI model) and the transaction processing engine 150-4 may process the determined account transfers.

The ML engine 150-5 may be configured to train an artificial intelligence (AI) model based on information associated with historical transactions (e.g., as stored in the database 150-4). For example, the training engine 150-5 may train the AI model based on information indicated in historical electronic fund transfer requests and/or information associated with historical card transactions. The ML engine 150-5 may use information stored in the database 150-4 as hyperparameters for training the AI model. As further described herein, the ML engine 150-5 may use the AI model to determine account transfers between accounts corresponding to a client based on other transactions/transfers (e.g., credit card/debit card transactions, electronic fund transfers, etc.). The transaction processing engine 150-3 may, based on account transfers as determined by the AI model, move funds between different accounts associated with a client.

While FIG. 1A illustrates the transaction processing platform 105 as being separate from other elements connected in communication network 100, in one or more other arrangements, various elements of the transaction processing platform 105 may be included in other elements of the communication network. For example, the enterprise server(s) 110 may include one or more of the modules/components as described with reference to the transaction processing platform 105. Elements in the transaction processing platform 105 (e.g., the host processor(s) 155, the MAC processor(s) 160, the PHY processor(s) 165, the TX/RX module(s) 170, and one or more program modules stored in the memory(s) 150) may share hardware and software elements with and corresponding to, for example, the enterprise server(s) 110. In various examples, one or more operations described above with respect to the application server(s) and/or the database server(s) may be performed by servers/devices corresponding to the transaction processing platform 105. In various examples, one or more operations described herein with respect to the transaction processing platform 105 may be performed by the enterprise server(s) 110.

Figure 1C:
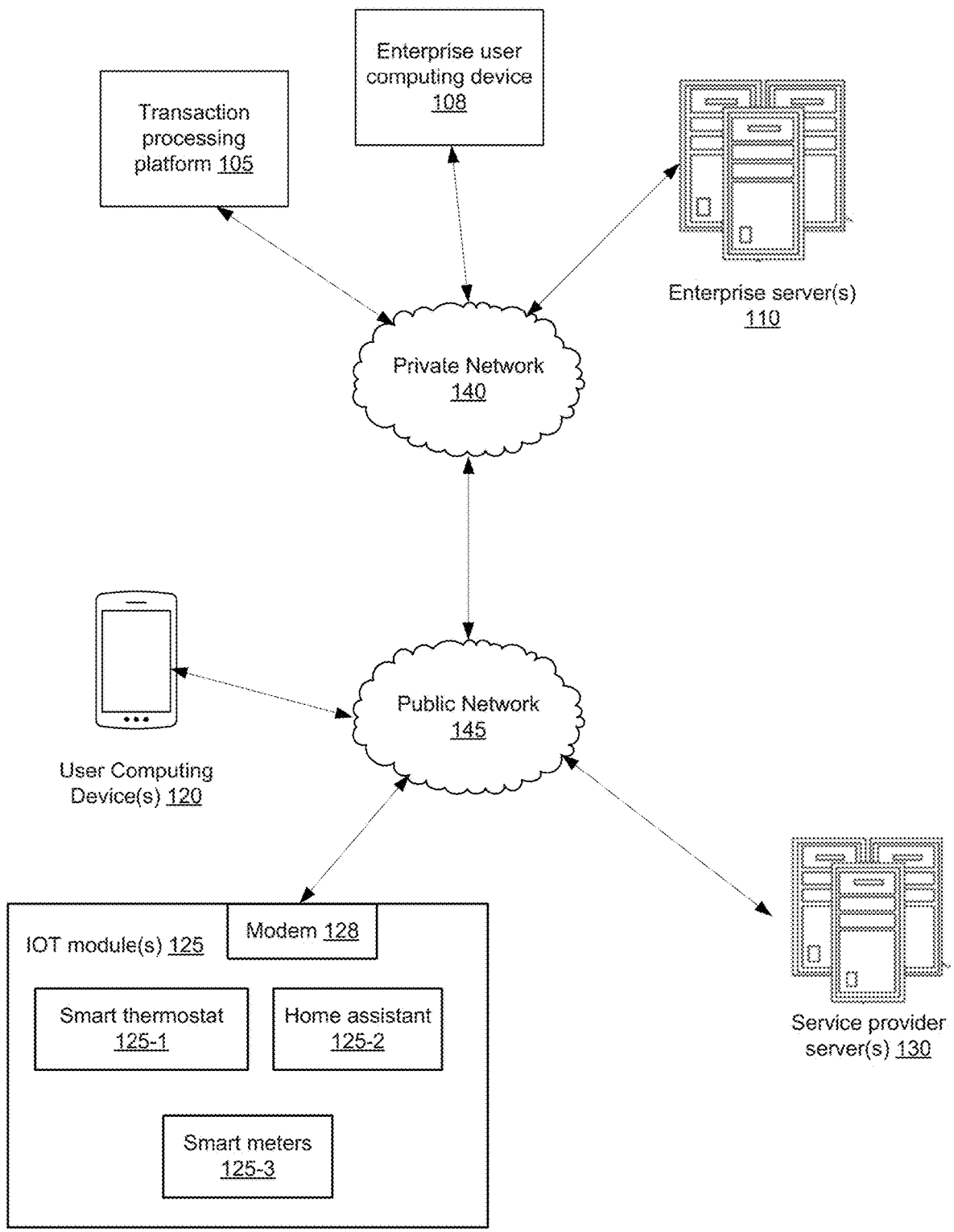
FIG. 1C illustrates a computing environment comprising one or more internet of things (IOT) modules, in accordance with one or more example arrangements.

FIG. 1C illustrates further details associated with IOT modules 125 in the computing environment 100, in accordance with one or more example arrangements. The IOT modules 125 may correspond to various smart devices that may be configured to track parameters associated with consumption associated with various utilities. The IOT modules 125 may also be configured to communicate (e.g., via the public network 145) with other devices in the computing environment 100. For example, the IOT modules 125 may be connected to a modem (e.g., using a wireless local area network (WLAN) protocol), which may be connected to the public network 145. The IOT modules 125 may correspond to appliances in a client residence and may comprise one or more of a smart thermostat 125-1, a home assistant 125-2, smart meters 125-3, etc.

The smart thermostat 125-1 may estimate an energy consumption (e.g., gas consumption) based on temperature settings used for the thermostat. The home assistant 125-2 may track an occupancy of the residence (which may correlate to utility consumption). The smart meters 125-3 may track consumption associated with various utilities (e.g., electricity, gas, etc.). The various determined parameters may be communicated to the transaction processing platform 105. In other arrangements, one or more of the IOT modules 125 may send indications of determined parameters to corresponding service provider servers 130. The transaction processing platform 105 may query the service provider servers 130 to determine the parameters. For example, the smart meter 125-3 may be an electricity meter that may send indications of electricity consumption to a server associated with an electricity distribution company, and the transaction processing platform 105 may receive the indications of electricity consumption from the server. As further described herein, the transaction processing platform 105 may, based on the parameters, predict upcoming expenses associated with the utilities.

Figure 2:
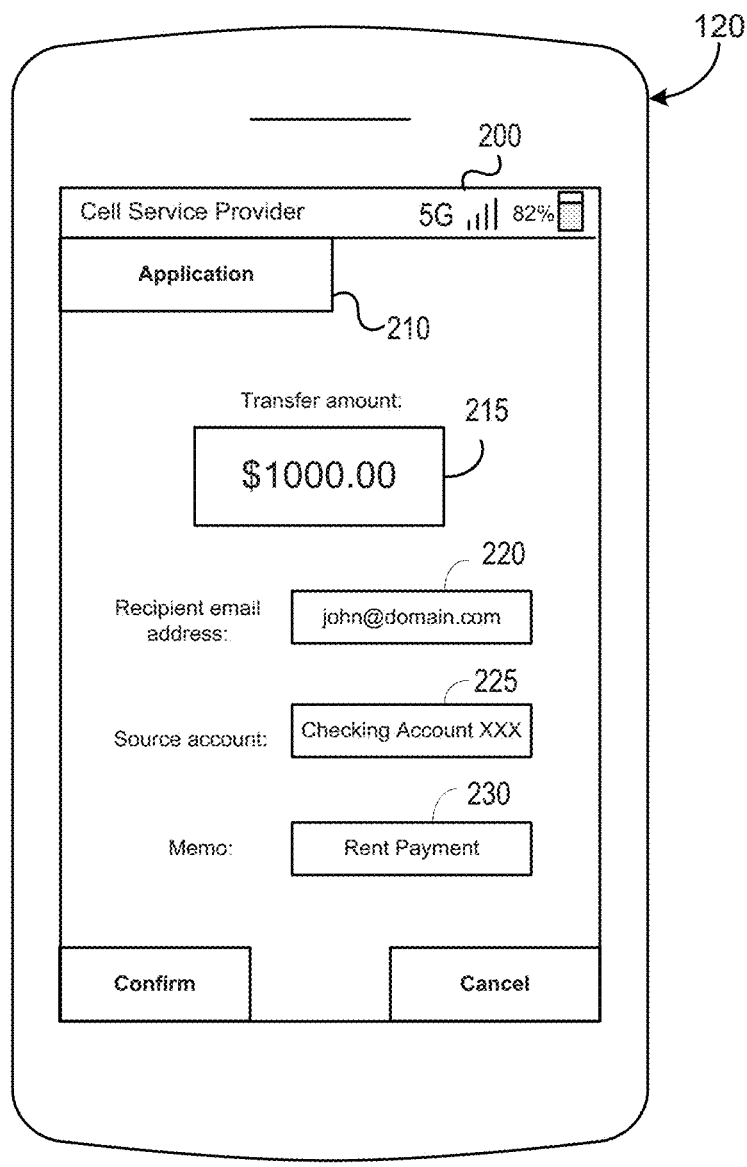
FIG. 2 illustrates an example graphical user interface (GUI) at a user computing device for initiating a fund transfer from a source account to a recipient account, in accordance with one or more example arrangements.

FIG. 2 illustrates an example graphical user interface (GUI) 200 at the user computing device 120 for initiating a fund transfer from a source account to a recipient account. The example user interface may correspond to an application 210 that may be used to initiate the fund transfer. The application 210 may be associated with the sender's bank. The GUI 200 may be used to input a transfer amount 215, a recipient account identifier 220, and a source account identifier 225. The recipient account identifier may be an account number or an email address/cellphone number that may be associated with the recipient account (e.g., as shown in FIG. 2). The GUI 200 may further include a memo field 230 that may be used to insert any description associated with the transfer. For example, a client initiating the fund transfer may include a purpose of the transfer in the memo field 230. The recipient account and the source account may correspond to same or different financial institutions.

The user computing device 120 may send information (e.g., input via the GUI 200), as part of an electronic fund transfer request, to the enterprise server(s) 110 and/or the transaction processing platform 105. The enterprise server(s) 110 and/or the transaction processing platform 105 may process the fund transfer from the source account to the recipient account based on the electronic fund transfer request. For example, the transaction processing platform 105 may pass on the information to deposit applications and credit engines. The deposit applications debit the transfer amount from the source account, and the credit engines verify the existence and status of the recipient account. The credit engines may create a credit transaction for the transfer amount to post to the recipient account in the next processing cycle.

Figure 3:
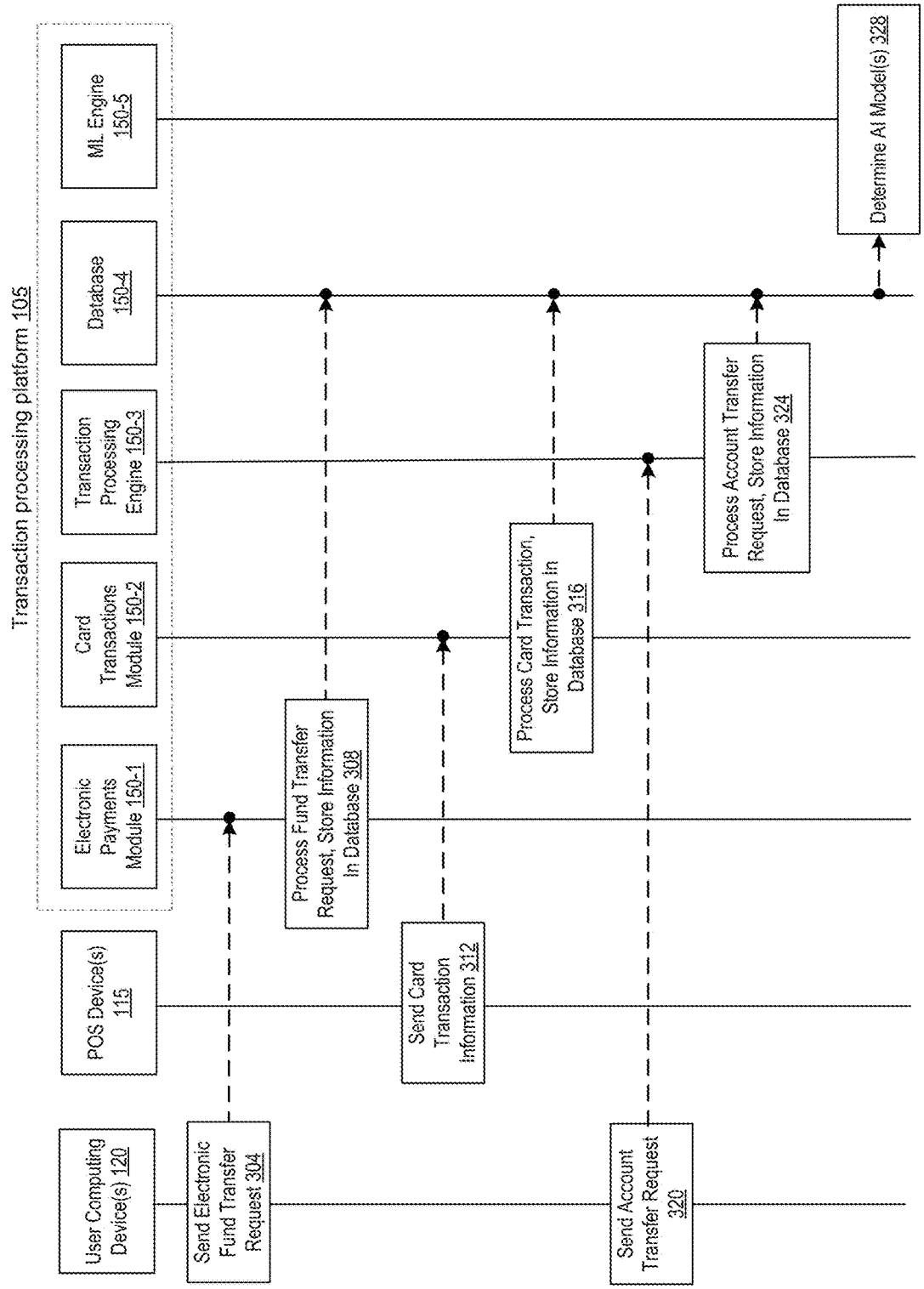
FIG. 3 illustrates an example event sequence for training an artificial intelligence (AI) model at the transaction processing platform, in accordance with one or more example arrangements.

FIG. 3 illustrates an example event sequence for training an AI model at the transaction processing platform 105, in accordance with one or more example arrangements. The AI model may be based on electronic fund transfers and/or card transactions initiated in the computing environment 100. The AI model may be used to automatically initiate transfers between accounts associated with a client.

At step 304, a user computing device 120 may send an electronic fund transfer request to the transaction processing platform 105. The electronic fund transfer request may be initiated by a client via the user computing device using the GUI 200 as described with reference to FIG. 2. The electronic fund transfer request may comprise information as input via the GUI 200.

At step 308, the electronic payments module 150-1 may process the electronic fund transfer request. For example, the electronic payments module 150-1 may communicate with database server(s) to determine whether a source account associated with the request has sufficient balance for the transfer. If the source account has sufficient balance for the transfer, the electronic payments module 150-1 may process the fund transfer as described with reference to FIG. 2. Further, the electronic payments module 150-1 may store information associated with the transfer request to the database 150-4. For example, the electronic payments module 150-1 may store, in the database 150-4 one or more of transfer amount, a recipient account identifier, a source account identifier, and/or text input in a memo field associated with the transfer request. For example, the electronics payments module 150-1 may store text input corresponding to the memo field in a dictionary data store associated with the database 150-4.

At step 312, a POS device 312 may send card transaction information to the transaction processing platform 105 (e.g., via a payment processor server). The card transaction information may comprise one or more of an MCC associated with a transaction, a merchant ID associated with the transaction, a transaction value, credit card/debit card information (e.g., card number, CVV), etc. In one or more arrangements, the transaction processing platform 105 may receive the card transaction information from website-based online interfaces (e.g., associated with online shopping portals, or bill payment interfaces).

At step 316, the card transactions module 150-2 may process the card transaction. For example, the card transactions module 150-2 may communicate with database server(s) to determine whether an account associated with the request has sufficient balance/credit for the card transaction. If the account has sufficient balance/credit for the transfer, the card transactions module 150-2 may approve the transaction and cause sending of an approval indication to the POS device 312 (e.g., or servers associated with the online interface). Further, the electronic payments module 150-1 may store information associated with the card transaction to the database 150-4. For example, the card transactions module 150-2 may store, in the database 150-4 one or more of the MCC, the merchant ID, the transaction value, the credit card/debit card information (e.g., card number, CVV), etc.

At step 320, a user computing device 120 may send, to the transaction processing platform 105, an account transfer request for moving funds between accounts associated with a client operating the user computing device 120. As described above, the client may be associated with multiple accounts (e.g., a checking account, a savings account, a homeownership savings account, a vacation account, a recurring expenses account, etc.) and the account transfer request may indicate a source account and a destination account among the multiple accounts associated with client. The user computing device 120 may be associated with a same client that initiated the electronic fund transfer request at step 304. Alternatively, the user computing device 120 may be associated with a client associated with an account that received an electronic fund transfer based on an electronic fund transfer request initiated by another client.

At step 324, the transaction processing engine 150-3 may process a fund transfer between the user accounts based on the account transfer request received at step 320. Further, the transaction processing engine 150-3 may store, in the database 150-4, information associated with the account transfer request (e.g., the source account, the destination account, the transfer value, etc.).

Steps 304-324 may be repeated for multiple transactions (e.g., electronic fund transfers, card transactions) initiated within the computing environment 100. One or more of the steps 304-324 may be omitted or may be performed in a different order. For example, a client may initiate an electronic fund transfer request at step 304 and follow that with an account transfer request between accounts associated with the client at step 320. As another example, a first client may receive an electronic fund transfer, to a first account associated with the first client, based on an electronic fund transfer request by a second client (at step 320). The first client may then send an account transfer request for transferring funds between the first account and a second account associated with the first client (at step 320).

At step 328, the ML engine 150-5 may use data stored in the database 150-4 at steps 308, 317, and 324 as training data for determining AI model(s) for transactions. The AI model(s) may be used to determine subsequent account transfers based on electronic fund transfers and/or card-based transactions. The ML engine 150-5 may determine, based on the AI model(s), a source account and destination account associated with a client for a subsequent account transfer. Additionally, the ML engine 150-5 may determine a value of the account transfer based on the AI model(s). The AI model(s) may be based on training data corresponding to transfers/transactions associated with multiple clients. Additionally, or alternatively, the ML engine 150-5 may develop AI model(s) for each individual client based on transfers/transactions associated with the client.

The ML engine 150-5 may use a pattern detection engine to determine patterns associated with electronic fund transfer requests (e.g. at step 304) and account transfer requests (e.g., at step 320) initiated by clients. For example, electronic fund transfer requests from a client at step 304 (e.g., during the first week of every month) may include the word "rent" in the memo field. Subsequent account transfer requests at step 320 (e.g., on the same day as the electronic fund transfer, or within a threshold period of time from the electronic fund transfer) from the client may be for transferring money from a checking account associated with the client to a "homeownership" account associated with the client. The ML engine 150-5 may associate electronic fund transfer requests with the word "rent" in the memo field with account transfers from a checking account to the "homeownership" account. For a future electronic fund transfer request with the memo word "rent," the ML engine 150-5 may prescribe/initiate a subsequent account transfer from the checking account associated with the client to the "homeownership" account associated with the client (as further described with reference to FIG. 4). The ML engine 150-5 may store memo words corresponding to detected patterns in a dictionary data store and associate the words with corresponding account transfers. With reference to the above example, the ML engine 150-5 may store "rent" in the dictionary data store. The ML engine 150-5 may prescribe/initiate the subsequent request for transferring funds from the checking account to the "homeownership" account based on detecting the word "rent" in the future request and determining that "rent" is present in the dictionary data store.

The ML engine 150-5 may store memo words in the dictionary data store based on a frequency of their use in memo fields corresponding to electronic fund transfer requests. For example, if a memo field term appears frequently, the ML engine 150-5 may add the memo field term to the dictionary data store and use it for future processing. Additionally, or alternatively, the transaction processing platform 105 may send a notification to user computing device 120, wherein the notification may prompt the client to add the memo field term to the dictionary data store. Based on receiving an approval notification from the user computing device, the ML engine 150-5 may add the memo field term to the dictionary data store and use it for future processing.

In an arrangement, the ML engine 150-5 may detect periodic transfers initiated by a client and accordingly prescribe/initiate future transfers. For example, a client may initiate account transfer requests every month (e.g., on the $1^{st}$ of every month) from a checking account to a "recurring expenses" account. The ML engine 150-5 may determine the pattern of account transfer requests and prescribe/initiate an account transfer every month, from the checking account, to the "recurring expenses" account.

The ML engine 150-5 may detect patterns based on activities associated with multiple clients. For example, the ML engine 150-5 may determine that, of all clients that initiate electronic fund transfers with specific memo field terms/phrases (e.g., "rent"), a specific percentage of clients also initiate an account transfer from checking account to an account associated with savings for a home purchase (e.g., a "homeownership" account). If the percentage of clients is greater than a threshold, the ML engine 150-5 may prescribe, for another client initiating an electronic fund transfers with the specific memo field term "rent", an account transfer from a checking account to an account associated with savings for home purchase. The ML engine 150-5 may store the memo word corresponding to the detected pattern as associated with multiple clients (e.g., "rent" in the above example).

As another example, the ML engine 150-5 may determine a spending pattern of a client based on MCCs, merchant IDs, etc. for a client as stored in a database. The ML engine 150-5 may compare a savings rate (e.g., amount transferred to a savings account per month) for a client with savings rates of other clients with the similar spending pattern. Spending pattern may correspond to an amount spent for different categories of merchants (e.g., groceries, travel, clothing, etc.). If the savings rates for the client is lower than an average savings rates for the other clients, the ML engine 150-5 may prescribe/indicate, to the client, a recommendation to increase their savings rate.

As another example, the ML engine 150-5 may recommend a client to configure a savings account (e.g., for a particular savings goal) based on savings accounts for clients with a same spending pattern. For example, the ML engine 150-5 may determine that other clients with a same spending pattern as a specific client also are likely to have an account for vacation savings (e.g., more than 50% of the other clients have an account for vacation savings). Based on the determination, the ML engine 150-5 may recommend that client configure an account for vacation savings.

With reference to information associated with the electronic fund transfer request (e.g., as sent at step 304) stored in the database 150-4, the ML engine 150-5 may use a support vector machine (SVM) to classify text used in memo fields and associate it with specific savings goals/accounts. For example, memo field terms/phrases associated with historical fund transfer requests and stored in the database 150-4 may be used to train the SVM. The SVM may determine best decision boundaries between different vectors (corresponding to memo field/phrases) to classify them as being associated with particular savings goals/accounts. The decision boundaries may then be used to classify memo field words/phrases, in an electronic fund transfer request, to a specific savings goal/account. The ML engine 150-5 may prescribe/initiate transfer to an account associated with the savings goal determined based on the SVM (as further described with reference to FIGS. 4 and 7).

As described above, clients may configure multiple savings account, each associated with a different savings goal and a different name. In an arrangement, the ML engine 150-5 may determine a savings goal associated with an account based on the account name. SVM may be used to classify accounts and determine associated savings goal. For example, a client may configure a savings account with a name "home goal," "house purchase", or "homeownership," and the SVM may classify the account as being associated with home purchase goal. As another example, a client may configure a savings account with a name "vehicle," "car," or "auto," and the SVM may classify the account as being associated with savings for a vehicle purchase.

Figure 4:
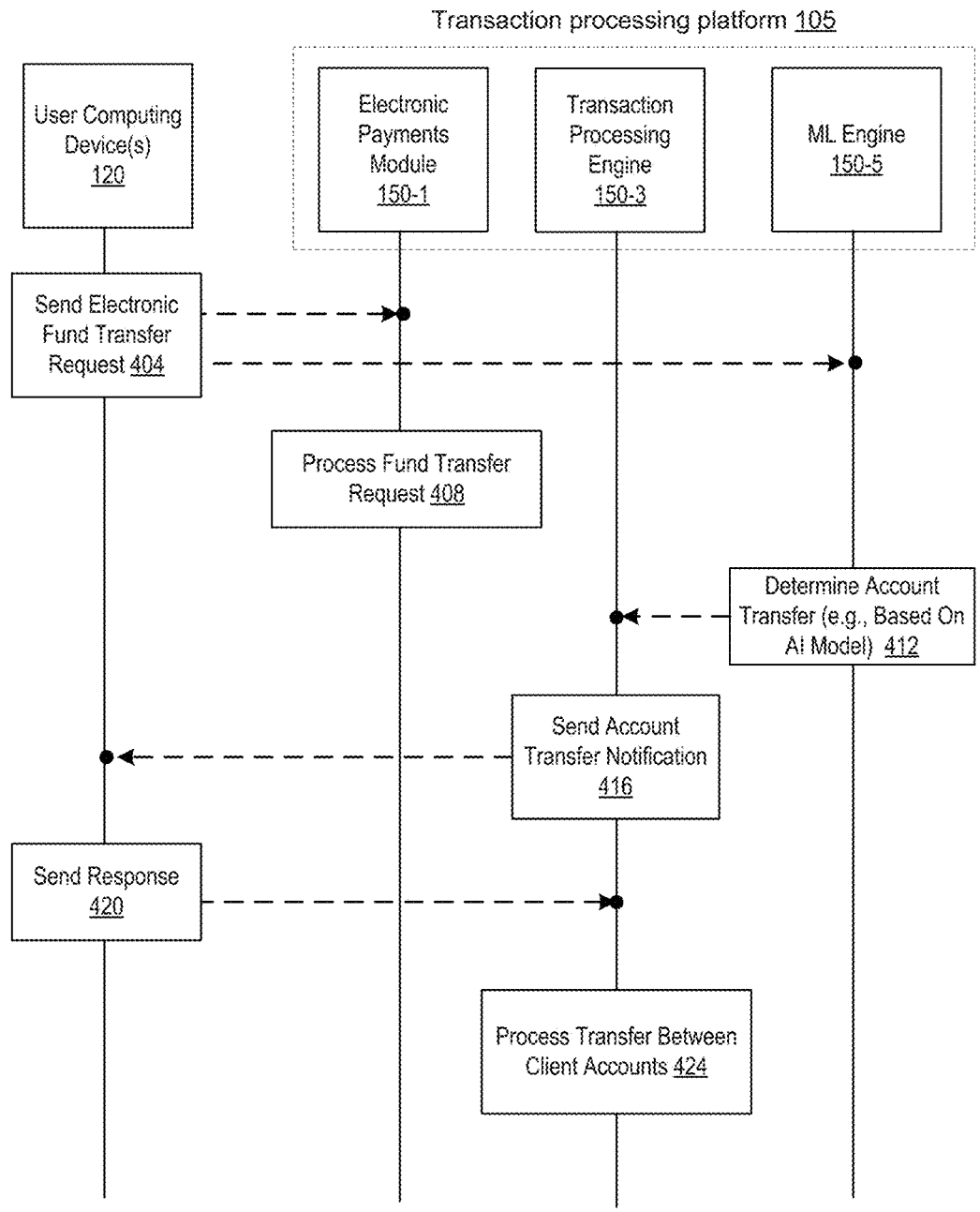
FIG. 4 illustrates an example event sequence for initiating account transfers based on an electronic fund transfer, in accordance with one or more example arrangements.

FIG. 4 illustrates an example event sequence for initiating account transfers based on an electronic fund transfer, in accordance with one or more example arrangements. At step 404, a user computing device 120 may send an electronic fund transfer request to the transaction processing platform 105. The electronic fund transfer request may be initiated by the client via the user computing device using the GUI 200 as described with reference to FIG. 2. The electronic fund transfer request may comprise information as input via the GUI 200. At step 408, the electronic payments module 150-1 may process the electronic fund transfer request. For example, the electronic payments module 150-1 may communicate with database server(s) to determine whether a source account associated with the request has sufficient balance for the transfer. If the source account has sufficient balance for the transfer, the electronic payments module 150-1 may process the fund transfer as described with reference to FIG. 2.

At step 412, the ML engine 150-5 may determine, based on the electronic fund transfer request, an account transfer to be initiated between a source account and a destination account associated with the client. The ML engine 150-5 may determine information associated with the account transfer based on a generated AI model (e.g., as described with reference to FIG. 3). The ML engine 150-5 may determine the account transfer based on an available balance on a source account associated with the client. For example, the ML engine 150-5 may determine the account transfer if a balance available in the source account is greater than a threshold value.

The ML engine 150-5 may determine the account transfer based on one or more considerations (e.g., as described with reference to FIG. 3). The ML engine 150-5 may use a pattern detection engine to determine that the electronic fund transfer request at step 404 corresponds to a pattern that was previously detected. The ML engine 150-5 may determine the account transfer based on the pattern. For example, as described with reference to FIG. 3, the ML engine 150-5 may associate electronic fund transfer requests with the word "rent" in the memo field with subsequent account transfers from a checking account to the "homeownership" account (e.g., based on historical transfer patterns). Based on a memo field associated with the electronic fund transfer request (at step 404) including the word "rent," the ML engine 150-5 may determine (at step 412) an account transfer from the checking account to the "homeownership" account. The ML engine 150-5 may store an association between terms used in a memo field and subsequent account transfer information (e.g., an indication of a destination account) in a rules database (e.g., the database 150-4). The ML engine 150-5 may use the association to process account transfers based on future electronic fund transfers.

Additionally, or alternatively, a client may configure a dictionary data store with specific words/phrases to be searched in memo field to initiate account transfers to specific savings accounts. For example, the client may configure different savings accounts associated with different savings goal and further configure, for each of the account, one or more words/phrases. Based on the electronic fund transfer request (as sent at step 404) comprising a word/phrase associated with a savings account, the transaction processing platform 105 may determine (at step 412) an account transfer from the checking account to the savings account. The dictionary data store may be stored in a database (e.g., the database 150-4).

The ML engine 150-5 may add words/phrases to the dictionary data store based on a frequency of their use by a client. For example, if a client performs a threshold number of transfers with same memo word/phrase (e.g., in a predefined time period), the ML engine 150-5 may send a message to a user computing device 120 associated with the client inquiring whether the client would want to include the memo word/phrase to the dictionary data store. The message may further request the client to indicate a savings account that may be associated with the word/phrase. As described above, based on the electronic fund transfer request (as sent at step 404) comprising the word/phrase, the transaction processing platform 105 may determine (at step 412) an account transfer from the checking account to the savings account associated with the word/phrase.

Additionally, or alternatively, the ML engine 150-5 may use an SVM to classify memo words/phrases corresponding to the electronic fund transfer request (e.g., as sent at step 404). Based on the classification, the SVM may determine a savings goal. The ML engine 150-5 may determine (at step 412) an account transfer from the checking account to a savings account associated with the determined savings goal. For example, the SVM may classify memo word "car rental" as being associated with an account for savings towards a vehicle purchase. Based on this determination, the ML engine 150-5 may determine an account transfer from a checking account to an account classified for savings towards a vehicle purchase. The ML engine 150-5 may use an SVM to classify an account as being an account for savings towards a vehicle purchase (e.g., based on a name associated with the account). Alternatively, the client may classify a specific account as an account for savings towards a vehicle purchase.

Additionally, or alternatively, the ML engine 150-5 may use a look-up table to determine an account transfer. The look-up table may comprise memo words/phrases, corresponding savings goals, and a value of the transfer. Based on the look-up table and the words/phrases included in the electronic fund transfer request (e.g., sent at step 404), the ML engine 150-5 may determine a corresponding savings goal and a value of the transfer. The ML engine 150-5 may determine (at step 412) an account transfer from the checking account to a savings account associated with the determined savings goal. The look-up table may be configured by a user associated with the enterprise user computing device 108 and/or may be stored in the database 150-4.

The ML engine 150-5 may additionally determine a value of the account transfer. The value of the account transfer may be based on values of historical account transfers as initiated by the client (e.g., at step 320 in FIG. 3). For example, the value of the account transfer between two accounts may be equal to a value of a previous transfer between the two accounts. Alternatively, the value of the account transfer may be configured by the client. The value of the account transfer may be a specific dollar value (e.g., $2, $5, etc.) or a percentage of the value of the electronic fund transfer.

At step 416, the transaction processing engine 150-3 may send an account transfer notification to the user computing device 120. The account transfer notification may indicate details associated with the account transfer as determined at step 412. For example, if the ML engine 150-5 determines an account transfer from a checking account to a "homeownership" account, the savings notification may indicate the checking account and the "homeownership" savings account.

Figure 5:
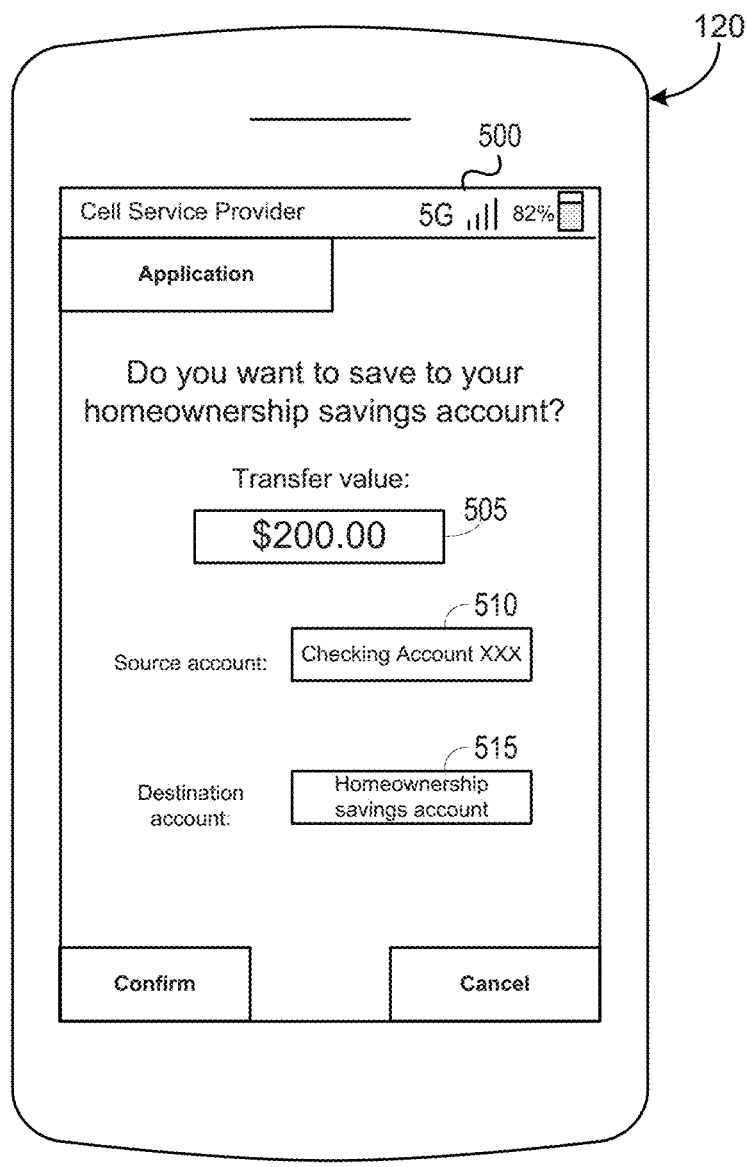
FIG. 5 illustrates an example GUI that may be displayed at the user computing device based on receiving an account transfer notification, in accordance with one or more example arrangements.

FIG. 5 illustrates an example GUI 500 that may be displayed at the user computing device 120 based on receiving an account transfer notification, in accordance with one or more example arrangements. The GUI 500 may display a transfer amount 505, a source account 510 and a destination account 515. For example, if the ML engine 150-5 determines an account transfer from the checking account to the "homeownership" account, the GUI 500 may indicate the checking account and the "homeownership" account. The client may modify details associated with the account transfer (e.g., source account, destination account, and/or transfer value, etc.) using the GUI 500.

At step 420, the user computing device 120 may send a response to the transaction processing platform 105. The response may be an approval notification confirming the account transfer as determined by the ML engine 150-5. At step 424, the transaction processing engine 150-3 may process the account transfer based on receiving the response. For example, the transaction processing engine 150-3 may process a transfer from the checking account to the "homeownership" account based on the ML engine 150-5 determining the account transfer from the checking account to the "homeownership" account and based on receiving the response confirming the account transfer. In another example, the transaction processing engine may automatically process a transfer from the checking account to the "homeownership" account based on the ML engine 150-5 determining the account transfer from the checking account to the "homeownership" account.

Figure 6:
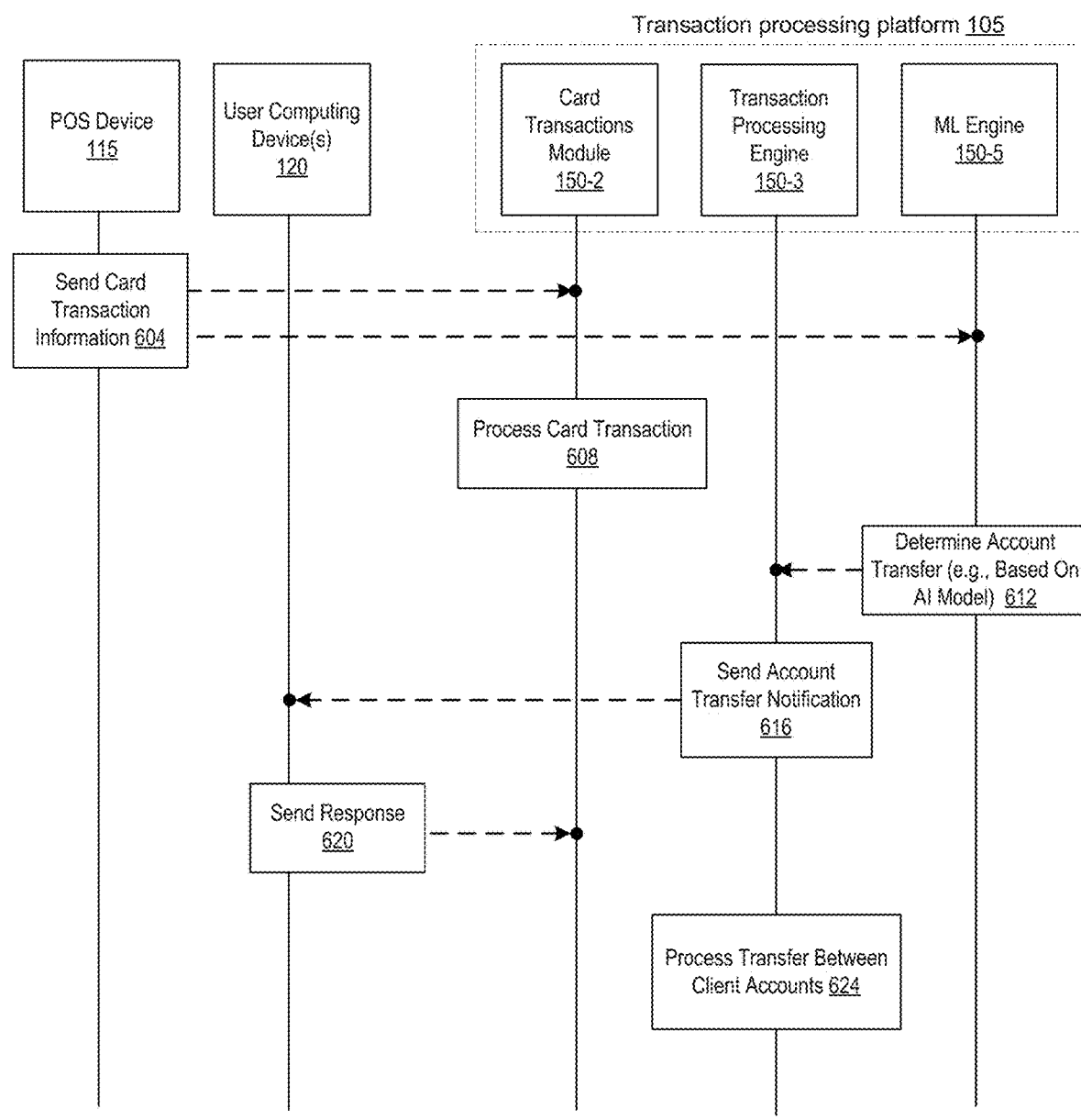
FIG. 6 illustrates an example event sequence for initiating account transfers based on a card-based transaction, in accordance with one or more example arrangements.

FIG. 6 illustrates an example event sequence for initiating account transfers based on a card-based transaction, in accordance with one or more example arrangements. At step 604, a POS device 115 may send (and the card transactions module may 150-2 receive) card transaction information associated with a credit/debit card transaction. In an arrangement, the POS device 115 may send the card transaction information to the payment processor server 135 and the payment processor server 135 may send the card transaction information to the card transactions module 150-2. The card transaction information may comprise one or more of an MCC associated with a transaction, a merchant ID associated with the transaction, a transaction value, credit card/debit card information (e.g., card number, CVV), etc. In one or more arrangements, the transaction processing platform 105 may receive the card transaction information from website-based online interfaces (e.g., associated with online shopping portals, or bill payment interfaces). At step 608, the card transactions module 150-2 may process the card transaction based on considerations described with reference to step 316 in FIG. 3.

At step 612, the ML engine 150-5 may determine, based on the card transaction information, an account transfer to be initiated between a source account and a destination account associated with the client. The ML engine 150-5 may determine information associated with the account transfer based on a generated AI model (e.g., as described with reference to FIG. 3). The ML engine 150-5 may determine the account transfer based on an available balance on a source account associated with the client. For example, the ML engine 150-5 may determine the account transfer if a balance available in the source account is greater than a threshold value.

Specific MCCs and/or merchant IDs may be associated with specific destination accounts. As described above, an SVM may be used to associate savings accounts, configured by the client, with corresponding savings goals. Based on the classification of accounts and the card transaction information, the ML engine 105-5 may determine the destination account for the account transfer. For example, the client may configure three savings accounts with names "homeownership," "vehicle", and "vacation." The ML engine 105-5 may, based on the SVM, classify the "homeownership" account as an account associated with savings for a home purchase, the "vehicle" account as an account associated with savings for a vehicle purchase, and the "vacation" account as an account associated with savings for vacation expenses.

If an MCC in the card transaction information corresponds to a home maintenance or repair purchases, the ML engine 105-5 may determine an account transfer from a checking account to an account associated with savings for a home purchase (e.g., "homeownership" account). As another example, if an MCC in the card transaction information corresponds to a car rental, the ML engine 105-1 may determine an account transfer from a checking account to account associated with savings for a vehicle purchase (e.g., "vehicle"). As another example, if an MCC in the card transaction information corresponds to a travel related purchase (e.g., hotel, air tickets), the ML engine 105-1 may determine an account transfer from a checking account to account associated with vacation savings (e.g., "vacation").

The ML engine 105-5 may determine (e.g., using a pattern detection engine) patterns associated with historical card-based transactions (e.g., as stored at step 316) and determine an account transfer based on the patterns. For example, based on MCCs and/or merchant IDs associated with the historical card-based transactions the ML engine 105-5 may determine that the client is spending higher than average for home maintenance and repair purchases. Based on this determination, the ML engine 105-5 may determine an account transfer from a checking account to an account associated with savings for a home purchase (e.g., "homeownership" account).

The ML engine 150-5 may also determine a value of the account transfer. As an example, the value of the account transfer may be equal to a "round up" amount. In one arrangement, the round up amount may be an amount of excess funds produced by applying a rounder transaction to the amount of a transaction at the POS device 120. If the rounder transaction rounds up to the nearest dollar, for example, a purchase made for $54.08 at the POS device 120 would generate a rounded amount of $0.92. The value of the account transfer may then be equal to the rounded up amount of $0.92. Other embodiments of the present disclosure may determine the value of the account transfer as a percentage of the purchase value, or a fixed amount of money (e.g., $2, $5, etc.).

In an arrangement, determination of a destination account associated with the account transfer may be based on a look-up table. The look-up table may include a listing of savings accounts associated with the client and corresponding merchant IDs and/or MCCs. The ML engine 105-5 may determine a destination account to be a savings account that is associated with the merchant ID or MCC code in the look-up table. The look-up table may further indicate corresponding source accounts and/or values of account transfers.

At step 616, the transaction processing engine 150-3 may send an account transfer notification to the user computing device 120. The account transfer notification may indicate details associated with the account transfer as determined at step 612 (e.g., source account, destination account, transfer value). For example, if the ML engine 150-5 determines an account transfer from a checking account to account associated with savings for a home purchase (e.g., "homeownership" account), the account transfer notification may indicate the checking account and the "homeownership" account. Based on receiving the account transfer notification, the user computing device 120-2 may display a GUI (e.g., similar to the GUI 500) which may then be used to confirm (or reject) the account transfer. In other examples, the account transfer notification may be a push notification, an email message, a short messaging service (SMS) message, etc.

At step 620, the user computing device 120 may send a response to the transaction processing platform 105 (e.g., based on receiving client input via the GUI 500). The response may be an approval notification confirming the account transfer as determined by the ML engine 150-5. At step 624, the transaction processing engine 150-3 may process the account transfer based on receiving the response. For example, the transaction processing engine 150-3 may process a transfer from the checking account to the "homeownership" account based on the ML engine 150-5 determining that the MCC in the card transaction information corresponds to home maintenance or repair purchases and based on receiving the response confirming the account transfer. In another example, the transaction processing engine 150-3 may automatically process a transfer from the source account to the destination account based on the ML engine 150-5 determining the account transfer from the source account to the destination account.

Figure 7:
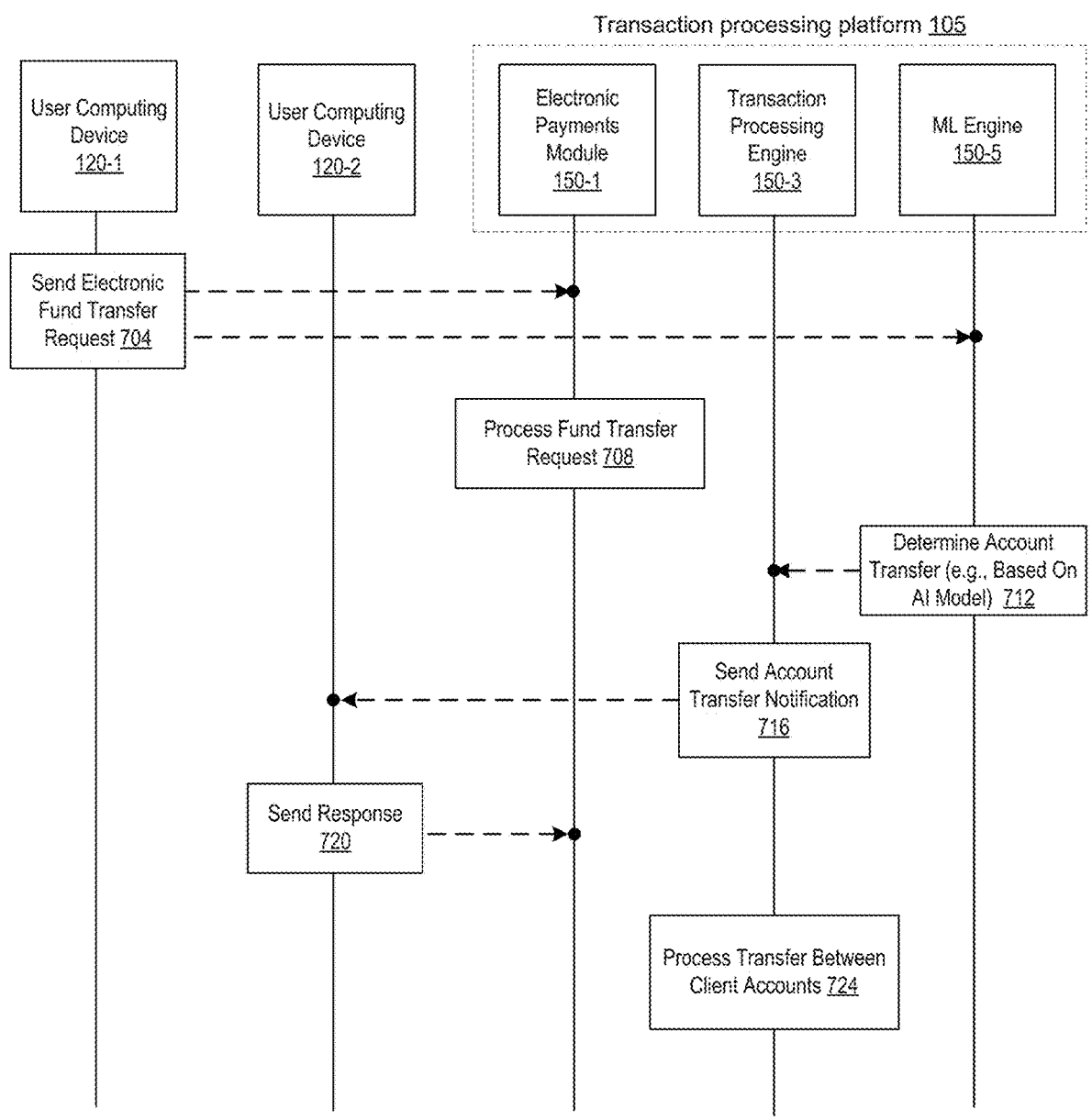
FIG. 7 illustrates an example event sequence for initiating account transfers based on electronic fund transfers, in accordance with one or more example arrangements.

FIG. 7 illustrates an example event sequence for initiating account transfers based on electronic fund transfers, in accordance with one or more example arrangements. In contrast to the event sequence described with reference to FIG. 4, the example event sequence shown in FIG. 7 corresponds to an account transfer between accounts associated with a client who has received an electronic fund transfer.

At step 704, a first user computing device 120-1, associated with a first client, may send an electronic fund transfer request to the transaction processing platform 105. The electronic fund transfer request may correspond to a request for an electronic fund transfer from an account associated with the first client to an account associated with a second client. The electronic fund transfer request may be initiated by the first client via the user computing device using the GUI 200 as described with reference to FIG. 2. The electronic fund transfer request may comprise information as input via the GUI 200. At step 708, the electronic payments module 150-1 may process the electronic fund transfer request. For example, the electronic payments module 150-1 may communicate with database server(s) to determine whether the account associated with the first client has sufficient balance for the transfer. If the account associated with the first client has sufficient balance for the transfer, the electronic payments module 150-1 may process the fund transfer to the account associated with the second client (e.g., as described with reference to FIG. 2).

At step 712, the ML engine 150-5 may determine, based on the electronic fund transfer request, an account transfer to be initiated between a source account associated with the second client and a destination account associated with the second client. The source account may be the account to which the fund transfer was processed at step 708. The ML engine 150-5 may determine, based on a generated AI model (e.g., as described with reference to FIG. 3), information associated with the account transfer. The ML engine 150-5 may determine the account transfer based on an available balance on a source account associated with the second client. For example, the ML engine 150-5 may determine the account transfer if a balance available in the source account associated with the second client is greater than a threshold value. The ML engine 150-5 may determine a value of the account transfer based on various consideration described with reference to FIG. 4.

The ML engine 150-5 may determine the account transfer based on one or more considerations (e.g., as described with reference to FIG. 3). The ML engine 150-5 may determine that the electronic fund transfer request at step 704 corresponds to a pattern that was previously detected. The ML engine 150-5 may determine the account transfer based on the pattern. For example, the second client may have previously received an electronic fund transfer (e.g., to a checking account) with the memo term "rent" and may have subsequently initiated an account transfer for $200 from the checking account to a "mortgage" account. The ML engine 150-5 may determine this pattern of transfers and associate incoming electronic fund transfers with the word "rent" in the memo field with subsequent account transfers from the checking account to the "mortgage" account. Thereafter, based on a memo field associated with the electronic fund transfer request (at step 707) including the word "rent," the ML engine 150-5 may determine (at step 712) an account transfer of $200 from the checking account of the second client to the "mortgage" account of the second client.

Additionally, or alternatively, the second client may configure specific words/phrases to be searched in a memo field associated with incoming electronic fund transfers to initiate account transfers to specific savings accounts. For example, the second client may configure different savings accounts associated with different savings goal and further configure, for each of the account, one or more words/phrases. Based on a memo field of an incoming electronic fund transfer comprising a word/phrase associated with a savings account, the transaction processing platform 105 may determine (at step 712) an account transfer from the checking account to the savings account. The configured words/phrases may be stored in a database (e.g., the database 150-4).

Additionally, or alternatively, the ML engine 150-5 may use an SVM to classify memo words/phrases corresponding to the incoming electronic fund transfer request (e.g., as sent at step 404). Based on the classification, the SVM may determine a savings goal. The ML engine 150-5 may determine (at step 712) an account transfer from the checking account (of the second client) to a savings account (of the second client) associated with the determined savings goal.

Additionally, or alternatively, the ML engine 150-5 may use a look-up table comprising memo words/phrases and corresponding savings goals. Based on the look-up table and the words/phrases included in the incoming electronic fund transfer request, the ML engine 150-5 may determine a corresponding savings goal. The ML engine 150-5 may determine (at step 712) an account transfer from the checking account (of the second client) to a savings account (of the second client) associated with the determined savings goal. The look-up table may be configured by a user associated with the enterprise user computing device 108 and/or may be stored in the database 150-4.

At step 716, the transaction processing engine 150-3 may send an account transfer notification to a user computing device 120-2 associated with the second client. The account transfer notification may indicate details associated with the account transfer as determined at step 712. For example, if the ML engine 150-5 determines an account transfer from a checking account to a "mortgage" account, the account transfer notification may indicate the checking account and the "mortgage" account. Based on receiving the account transfer notification, the user computing device 120-2 may display a GUI (e.g., similar to the GUI 500) which may then be used to confirm (or reject) the account transfer. In other examples, the account transfer notification may be a push notification, an email message, a short messaging service (SMS) message, etc.

At step 720, the user computing device 120-2 may send a response to the transaction processing platform 105 (e.g., based on receiving client input via the GUI 500). The response may be an approval notification confirming the account transfer as determined by the ML engine 150-5. At step 724, the transaction processing engine 150-3 may process the account transfer based on receiving the response. For example, the transaction processing engine 150-3 may process a transfer from the checking account to the mortgage account based on the ML engine 150-5 determining the account transfer from the checking account to the mortgage account and based on receiving the response confirming the account transfer. In another example, the transaction processing engine may automatically process a transfer from the checking account to the mortgage account based on the ML engine 150-5 determining the account transfer from the checking account to the "mortgage" account.

Figure 8:
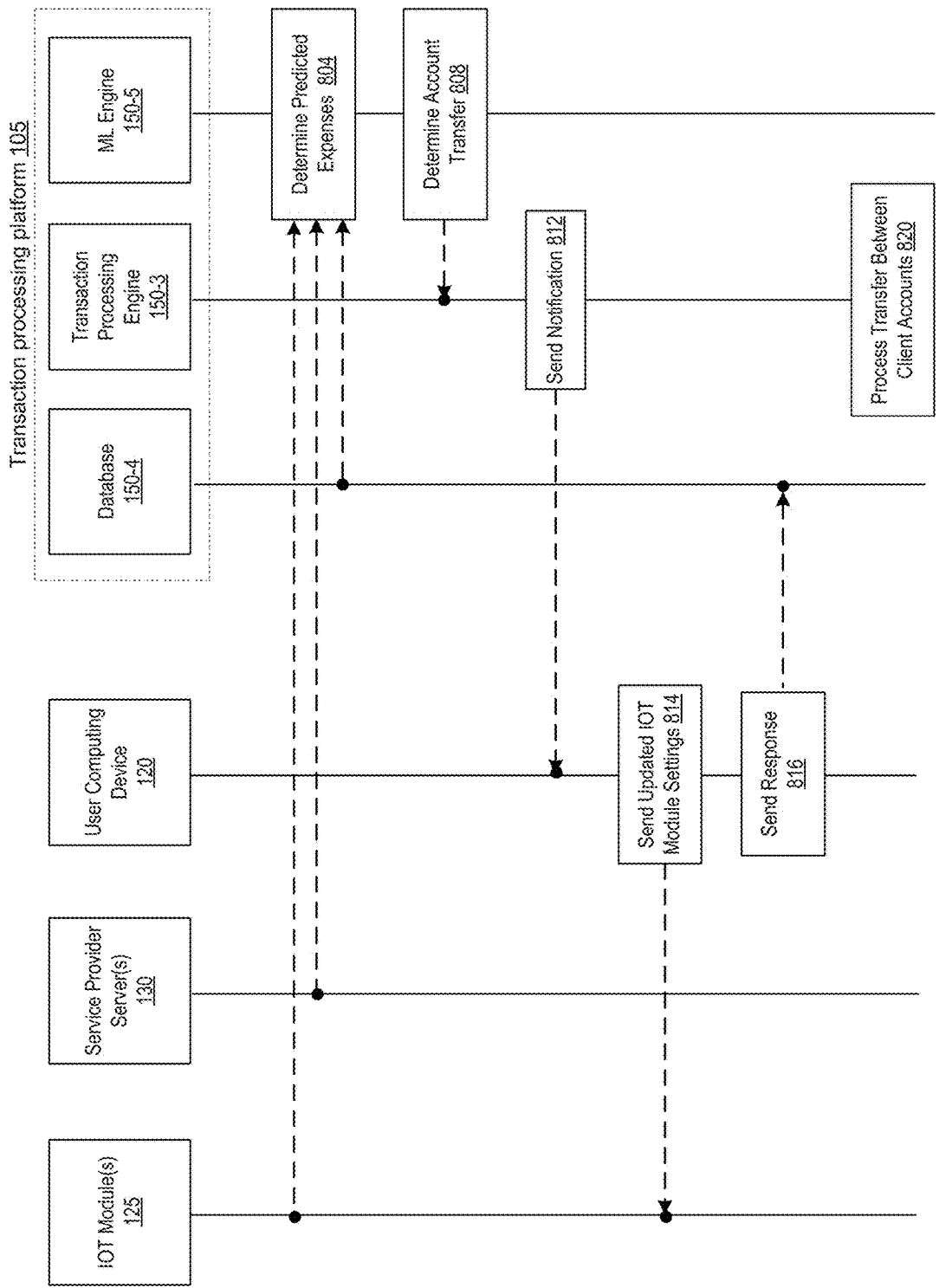
FIG. 8 illustrates an example event sequence for performing one or more actions based on real-time monitoring of utility consumption, in accordance with one or more example arrangements.

FIG. 8 illustrates an example event sequence for performing one or more actions based on real-time monitoring of utility consumption, in accordance with one or more example arrangements. In an arrangement, the example event sequence may be used for initiating account transfers based on predicted consumption of a utility. In an arrangement, the example event sequence may be used for to adjust settings associated with utility consumption.

The client may configure one or more accounts for payments associated with utility expenses (e.g., gas, electricity, water, etc.), subscriptions, and/or other types of recurring expenses (e.g., subscription-based online audio/video streaming services, cable television services, telephony services, etc.). For example, the client may configure a "recurring expenses" account for managing recurring payments for all subscriptions and/or services. As another example, the client may configure separate accounts for different subscription and services.

At step 804, the transaction processing platform 105 may determine predicted upcoming expenses (e.g., utility expenses, subscriptions, etc.). The transaction processing platform 105 may determine the predicted upcoming expenses based on the IOT module(s) 125, the service provider server(s) 130, and/or information stored in the database 150-4. As described with reference to FIGS. 1A-1C, the IOT modules 125 may be correspond to smart devices that may determine/estimate, in real-time, usage/costs associated with various utility services. For example, the IOT module(s) 125 may be smart home appliances (e.g., smart thermostats, home assistant devices, smart meters, etc.) that may determine utility consumption and indicate the same to the transaction processing platform 105. The IOT module(s) 125 may send a utility usage notification, to the transaction processing platform 105, indicating the determined consumption of various utility services. In another example, the IOT module(s) 125 may send an indication of the consumption to a server associated with the IOT module(s) 125, and the transaction processing platform 105 may determine the consumption by communicating with the server (e.g., by sending a query message and receiving a response message indicating the consumption). Based on the determined consumption, the transaction processing platform 105 may predict upcoming expenses. As an example, the transaction processing platform 105 may determine a usage of a utility (e.g., electricity) during a first half of a current billing cycle. The transaction processing platform 105 may then predict a total usage of the utility (and/or expenses associated with the utility) for the entirety of the billing cycle based on the usage during the first half of the billing cycle. The transaction processing platform 105 may store (e.g., in the database 150-4) per unit cost associated with the utility (e.g., costs per kilowatt hour) and use the per unit costs to predict expenses associated with the utility based on the total usage of the utility.

In an arrangement, the IOT modules 125 may send other parameters that may be used by the transaction processing platform 105 to predict consumption of a utility. For example, an IOT module 125 may be a thermostat that may send, to the transaction processing platform 105, indications of temperature settings that are being used. The transaction processing platform 105 may predict costs associated with gas consumption based on the temperature settings being used. The transaction processing platform 105 may predict the costs based on historical settings used for the thermostat and historical payments made to the gas utility service provider.

The service provider server(s) 130 may be associated with enterprises providing utility services. A service provider server 130, associated with a utility service provider, may send one or more indications of historical consumption (or costs associated with the consumption) of a particular utility. The transaction processing platform 105 may predict a total usage/cost of a utility (e.g., for a current billing cycle) based on historical usage/costs. For example, the ML engine 150-5 associated with the transaction processing platform 105 may use the pattern detection engine to identify trends in historical consumption/costs for previous billing cycles and predict a total usage/cost of the utility for an ongoing/future billing cycle.

The service provider server(s) 130 may be associated with enterprises associated with other types of services (e.g., subscription-based online audio/video streaming services, cable television services, telephony services, etc.). The service provider server(s) 130 may provide/send, to the transaction processing platform 105, information associated with the services. For example, the service provider server(s) 130 may indicate recurring costs of subscriptions as availed by the client (e.g., online audio/video streaming services, cable television services, telephony services, etc.).

The transaction processing platform 105 may predict a total an upcoming recurring cost based on the recurring costs of the subscriptions.

As another example, the ML engine 150-5 may determine historical payments made from an account for utility services and/or other types of services. For example, the ML engine 150-5 may determine, using information stored in the database 150-4 (e.g., as described with reference to step 316 ion FIG. 3), historical payments made for the utility services and/or other types of services. The ML engine 150-5 may use a pattern recognition engine to determine a pattern associated with historical payments. Based on the determined pattern, the ML engine 150-5 may predict future expenses.

At step 808, the ML engine 150-5 may determine an account transfer based on the predicted upcoming expenses and funds present in accounts associated with the expenses. For example, as described above with reference to step 804, the transaction processing platform 105 may determine predicted usage/expenses associated with a utility. The ML engine 150-5 may compare the predicted expenses associated with the utility with funds present in an account configured for payments for the utility. If the predicted expenses are greater than the funds present the account configured for payments for the utility, the ML engine 150-5 may determine an account transfer (e.g., from a source account) to the account. If the predicted expenses are lower than the funds present the account configured for payments for the utility, the ML engine 150-5 may determine an account transfer from the account to another account (e.g., a checking account, a savings account, an account associated with other expenses). The value of the account transfer may be based on a difference between the predicted expenses and funds present in the account.

As another example, the ML engine 150-5 may determine recurring expenses associated with a service. The ML engine 150-5 may compare the recurring expenses associated with the service/subscription with funds present in an account configured for payments for the service/subscription. If the predicted expenses associated with the service are greater than the funds present the account configured for payments for the service, the ML engine 150-5 may determine an account transfer (e.g., from a source account) to the account. If the predicted expenses are lower than the funds present the account configured for payments for the utility, the ML engine 150-5 may determine an account transfer from the account to another account (e.g., a checking account, a savings account, an account associated with other expenses). The value of the account transfer may be based on a difference between the predicted expenses and funds present in the account.

For example, a client may configure a "heating" account for payment of heating/gas bills to a service utility. The transaction processing platform 105 may receive, from the IOT module 125 (or the service provider server 130 associated with the utility), real-time gas consumption data associated with the client. The ML engine 150-5 may predict, based on the gas consumption data, an estimated usage and costs associated with the usage for a current billing cycle (e.g., step 804). For example, the ML engine 150-5 may determine gas usage for the first 10 days of a 30-day billing cycle. Based on the usage over the first 10 days, the ML engine 150-5 may predict usage for the entirety of the billing cycle, and further determine the costs associated with the predicted usage. The ML engine 150-5 may determine (e.g., step 808) an account transfer from a source account (e.g., a checking account) to the "heating" account if the costs associated with the predicted usage exceeds a value of funds present in the "heating" account.

At step 812, the transaction processing engine 150-3 may send a notification to a user computing device 120 associated with the client. The notification may indicate details associated with the account transfer as determined at step 808. For example, if the ML engine 150-5 determines an account transfer from a source account (e.g., a checking account) to a "heating" account, the notification may indicate the checking account, the "heating" account, and/or the value of the account transfer. Based on receiving the notification, the user computing device 120 may display a GUI (e.g., similar to the GUI 500) which may then be used to confirm (or reject) the account transfer and/or input/edit the value of the account transfer.

Additionally, or alternatively, at step 812, the transaction processing engine 150-3 may send, to the user computing device 120 and based on determining that predicted expenses associated with a utility exceed a value of funds present in an account configured for payments for the utility, a notification to indicate that an IOT module 125 is to be set to a utility savings mode. At step 814, and based on the notification indicating that the IOT module 125 is to be set to the utility savings mode, the user computing device 120 may send, to the IOT module 125, updated IOT module settings to reduce consumption of the utility.

Alternatively, the transaction processing engine 150-3 may directly send the updated IOT module settings to the IOT module 125. For example, the transaction processing engine 150-3 may send, to the user computing device 120 and based on determining that predicted expenses associated with a utility exceed a value of funds present in an account configured for payments for the utility, a request for setting the IOT module 125 to the utility savings mode. Based on receiving the notification, the user computing device 120 may display a GUI (e.g., or a push notification) which may then be used to confirm (or reject) the reject. Based on user confirmation of the request, the user computing device 120 may send an approval notification indicating that the IOT module 125 may be set to the utility savings mode. Based on receiving the approval notification, the transaction processing engine 150-3 may send the updated IOT module settings to the IOT module 125.

For example, the IOT module 125 may be a smart thermostat that may have an "eco" mode for reduced energy consumption. The smart thermostat may be associated with an application, installed on the user computing device 120, that may be used to control the operation of the smart thermostat. The transaction processing platform 150-3 may send, to the user computing device 120 and based on determining that the predicted expenses associated with a gas utility exceed the value of funds present in the "heating" account, a notification indicating that the smart thermostat is to be set to the "eco" mode. Based on receiving the notification, the application may configure the smart thermostat to the "eco" mode. For example, the application may cause the user computing device 120 to send (e.g., at step 814) an indication that the smart thermostat is to operate in the "eco" mode. Based on receiving the indication, the smart thermostat may switch to "eco" mode operation.

At step 816, the user computing device 120 may send a response to the transaction processing platform 105 (e.g., based on receiving client input via the GUI). The response may be an approval notification confirming the account transfer as determined by the ML engine 150-5. At step 820, the transaction processing engine 150-3 may process the account transfer based on receiving the response. For example, the transaction processing engine 150-3 may process a transfer from the checking account to the "heating" account based on the ML engine 150-5 determining the account transfer from the checking account to the "heating" account and based on receiving the response confirming the account transfer. In another example, the transaction processing engine 150-3 may automatically (e.g., without sending the account transfer notification and receiving the response) process a transfer from the checking account to the "heating" account based on the ML engine 150-5 determining the account transfer from the checking account to the "heating" account.

In one or more arrangements, the ML engine 150-5 may adjust a value of account transfers, as described with reference to FIGS. 4-7, based on the determined predicted expenses. As described with reference to FIG. 4-7, the ML engine 150-5 may determine an account transfer in response to an electronic fund transfer request and/or a card-based transaction. The ML engine 150-5 may adjust a value of the account transfer based on the predicted expenses as determined at step 804 in FIG. 8. The value of the account transfer, for example, may be proportional to the predicted expenses. For example, the ML engine 150-5 may determine an account transfer to a "heating" account based on a credit card transaction (e.g., corresponding to a specific MCC). The value of the account transfer based on the credit card transaction may be proportional to a difference between the predicted costs associated with the gas consumption and the value of funds present in the "heating" account.

Additionally, or alternatively, the transaction processing platform 105 may send an alert notification based on the predicted upcoming expenses and funds present in accounts associated with the expenses. For example, if the predicted expenses for electricity are greater than the funds present the account configured for electricity bill payments, the transaction processing platform 105 may send an alert notification to the user computing device 120. The alert notification may indicate suggestions for the client to lower electricity usage. Additionally, or alternatively, the transaction processing platform 105 may indicate, to one or more IOT module(s) 125 to initiate an energy savings mode. For example, in the energy savings mode, the IOT module(s) 125 may be configured to turn of lights in a room automatically based on detecting that a room is not occupied.

The various steps described with reference to FIG. 8 may be performed in a order different from that illustrated. In an arrangement, one or more of the steps may be omitted.

FIG. 9 illustrates an example table 900 indicating a set of rules for processing transfers between different accounts associated with a client, in accordance with one or more example arrangements. The rules may comprise trigger conditions and corresponding transfer actions that may be initiated by the transaction processing platform 105 based on the trigger conditions. The trigger conditions may comprise an outgoing electronic fund transfer, an incoming electronic fund transfer, a card-based transaction, and/or a determination of predicted expenses. The transfer action may comprise account transfers between different accounts associated with a client. The table 700 may indicate example transfer actions performed by the transaction processing platform 105 based on various considerations described above with reference to FIGS. 3-9.

The table 900 may correspond to a particular client and may be manually configured by the client using the enterprise user computing device 120. In an arrangement, the rules associated with the table 900 may be determined by the training engine 150-5 (e.g., as described with reference to FIGS. 4-7). In an arrangement, the table 900 may be stored in the database 150-4 and may be used as a look-up table for determination of account transfers at the transaction processing platform 105.

As indicated in entry 905, if an outgoing transfer is initiated with a memo word "rent," the transaction processing engine 150-3 may process a transfer of 20% of the transfer value from the checking account to a "homeownership" account. Entry 910 may indicate that for any outgoing transfer, the transaction processing engine 150-3 may process a transfer of $2 from the checking account to a "recurring expenses" account. Entry 915 may indicate that if an incoming transfer is received with a memo word "rent," the transaction processing engine 150-3 may process a transfer of $200 from the checking account to a "mortgage" account.

The table 900 may comprise actions to be processed by the transaction processing platform 105 based on credit/debit card transactions. For example, entry 920 may indicate that for a credit card transaction at a merchant corresponding to MCC code 1, $1 may be transferred from the checking account to a "recurring expenses" account. Entry 925 may indicate that for a credit card transaction at a merchant corresponding to merchant ID 1, $10 may be transferred from the checking account to a "homeownership" account. Entry 930 may indicate that for any credit card transaction, $1 may be transferred from the checking account to a "vacation" account. Entry 935 may indicate that for a credit card transaction at a particular location (e.g., determined based on merchant ID), $1 may be transferred from the checking account to a "car purchase" account.

The table 900 may comprise actions to be processed by the transaction processing platform 105 based on determination of predicted expenses (e.g., using IOT module(s) 125, service provider server(s) 130, etc.). The client may configure a "utility expense" account for managing payments for a utility service. Entry 940 may indicate that if predicted expenses for a utility is lower that the utility expense account balance, the transaction processing engine 150-3 may process a transfer from the utility expense account to a checking account. Entry 945 may indicate that if predicted expenses for a utility is greater that the utility expense account balance, the transaction processing engine 150-3 may process a transfer from the checking account to the utility expense account.

The table 900 may comprise actions to be processed by the transaction processing platform 105 based on other account activities. In an arrangement, the transaction processing engine 150-3 may process a transfer from a source account to one or more destination accounts based on an incoming ACH transfer with a specific prearranged payment and deposit identifier (PPD ID). For example, entry 950 may indicate that the transaction processing engine 150-3 may process a transfer from a checking account to a "vacation" account and a "recurring expenses" account based on receiving an incoming ACH transfer, to the checking account, with a specific PPD ID.

Each savings account may be associated with a threshold savings value. For example, a client may set, for each of their savings account, corresponding threshold savings values. If the value of funds in a savings account exceeds a corresponding threshold savings value, the transaction processing engine 150-3 may cease any further transfers to the savings account. Additionally, or alternatively, the transaction processing engine 150-3 may instead transfer funds to a different savings account or a default savings account. For example, a "vacation" account may be configured with a threshold savings value of $1000. If the value of funds in the "vacation" account exceeds $1000, the transaction processing engine 150-3 may cease further transfers to the "vacation" account and instead (e.g., based on trigger conditions in entry 930 of FIG. 9) transfer funds to a "recurring expenses" account.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. An artificial intelligence (AI) architecture comprising:
a transaction database comprising:
information associated with historical outgoing payments from a first account associated with a first user, wherein the information associated with the historical outgoing payments comprises a dictionary data store comprising memo field terms associated with the historical outgoing payments; and
information associated with historical account transfers from the first account associated with the first user to other accounts associated with the first user;
and
a server comprising:
at least one processor; and
a memory storing computer-readable instructions that, when executed by the at least one processor, cause the server to:
generate, based on the dictionary data store, decision boundaries of vectors corresponding to the memo field terms, wherein the decision boundaries classify the memo field terms to corresponding savings goals;
receive, from a user computing device, a transaction indication for an outgoing payment from the first account associated with the first user, wherein the transaction indication comprises a memo field term;
identify, based on the memo field term and the decision boundaries, a savings goal associated with the outgoing payment;
send, to the user computing device, an account transfer notification, wherein the account transfer notification indicates a second account associated with the first user, wherein the second account is identified based on at least one of:
determining, based on the information associated with the historical account transfers, that a historical account transfer to the second account associated with the first user follows a historical outgoing payment associated with the savings goal, or
performing a support vector machine (SVM) analysis on an account name associated with the second account to identify that the second account is associated with the savings goal;
receive, from the user computing device, an approval notification; and
based on the approval notification, process an account transfer from the first account associated with the user to the second account associated with the first user, and
the user computing device, wherein the user computing device comprises:
at least one second processor; and
a memory storing second computer-readable instructions that, when executed by the at least one second processor, causes the user computing device to:
after sending the transaction indication, receive the account transfer notification;
based on receiving the account transfer notification, display, via a graphical user interface (GUI), a prompt for the account transfer from the first account associated with the first user to the second account associated with the first user; and
based on receiving a user input via the GUI, send to the server, the approval notification.

2. The AI architecture of claim 1, wherein the historical outgoing payments are historical electronic fund transfers from the first account associated with the first user to accounts associated with other users.

3. The AI architecture of claim 1, wherein the transaction indication is an electronic fund transfer request, received from the user computing device, for an electronic fund transfer from the first account associated with the first user to a third account associated with a second user.

4. The AI architecture of claim 1, wherein the historical outgoing payments correspond to card-based transactions, wherein the information associated with the historical outgoing payments comprises at least one selected from:
   merchant category codes (MCCs) associated with the card-based transactions;
   merchant identifiers associated with the card-based transactions;
   locations associated with the card-based transactions; and combinations thereof.

5. The AI architecture of claim 4, wherein the transaction indication is an indication corresponding to a card-based transaction, and wherein the transaction indication comprises at least one of:
   an MCC associated with the card-based transaction;
   a merchant identifier associated with the card-based transaction; or
   a location associated with the card-based transaction.

6. The AI architecture of claim 1, wherein the information associated with the historical account transfers comprises an indication of source accounts, destination accounts, and transfer values associated with the historical account transfers.

7. A method comprising:
   generating, based on a dictionary data store comprising memo field terms associated with historical outgoing payments from a first account associated with a first user, decision boundaries of vectors corresponding to the memo field terms, wherein the decision boundaries classify the memo field terms to corresponding savings goals;
   receiving, from a user computing device, a transaction indication for an outgoing payment from the first account associated with the first user, wherein the transaction indication comprises a memo field term;
   identify, based on the memo field term and the decision boundaries, a savings goal associated with the outgoing payment;
   sending, to the user computing device, an account transfer notification, wherein the account transfer notification indicates a second account associated with the first user, wherein the second account is identified based on at least one of:
      determining, based on information associated with historical account transfers from the first account associated with the first user to other accounts associated with the first user, that a historical account transfer to the second account associated with the first user follows a historical outgoing payment associated with the savings goal, or
      performing a support vector machine (SVM) analysis on an account name associated with the second account to identify that the second account is associated with the savings goal,
   wherein the sending the account transfer notification causes the user computing device to display, via a graphical user interface (GUI), a prompt for an account transfer from the first account associated with the first user to the second account associated with the first user;
   receiving, from the user computing device, an approval notification, wherein the approval notification is sent by the user computing device based on user input via the GUI; and
   based on the approval notification, processing the account transfer from the first account associated with the user to the second account associated with the user.

8. The method of claim 7, wherein the historical outgoing payments are historical electronic fund transfers from the first account associated with the first user to accounts associated with other users.

9. The method of claim 7, wherein the transaction indication is an electronic fund transfer request, received from the user computing device, for an electronic fund transfer from the first account associated with the first user to a third account associated with a second user.

10. The method of claim 7, wherein the historical outgoing payments correspond to card-based transactions, wherein the information associated with the historical outgoing payments comprises at least one selected from:
   merchant category codes (MCCs) associated with the card-based transactions;
   merchant identifiers associated with the card-based transactions;
   locations associated with the card-based transactions; and combinations thereof.

11. The method of claim 10, wherein the transaction indication is an indication corresponding to a card-based transaction, and wherein the transaction indication-comprises at least one of:
   an MCC associated with the card-based transaction;
   a merchant identifier associated with the card-based transaction; or
   a location associated with the card-based transaction.

12. The method of claim 7, wherein the information associated with the historical account transfers comprises an indication of source accounts, destination accounts, and transfer values associated with the historical account transfers.

13. A non-transitory computer readable medium storing computer executable instructions that, when executed by a processor, causes a transaction processing platform to:
   generate, based on a dictionary data store comprising memo field terms associated with historical outgoing payments from a first account associated with a first user, decision boundaries of vectors corresponding to the memo field terms, wherein the decision boundaries classify the memo field terms to corresponding savings goals;
   receive, from a user computing device, a transaction indication for an outgoing payment from the first account associated with the first user, wherein the transaction indication comprises a memo field term;
   identify, based on the memo field term and the decision boundaries, a savings goal associated with the outgoing payment;
   send, to the user computing device, an account transfer notification, wherein the account transfer notification indicates a second account associated with the first user, wherein the second account is identified based on at least one of:
      determining, based on information associated with historical account transfers from the first account associated with the first user to other accounts associated with the first user, that a historical account transfer to the second account associated with the first user follows a historical outgoing payment associated with the savings goal, or
      performing a support vector machine (SVM) analysis on an account name associated with the second account to identify that the second account is associated with the savings goal,
   wherein the sending the account transfer notification causes the user computing device to display, via a graphical user interface (GUI), a prompt for an account transfer from the first account associated with the first user to the second account associated with the first user;

receive, from the user computing device, an approval notification, wherein the approval notification is sent by the user computing device based on user input via the GUI; and based on the approval notification, processing the account transfer from the first account associated with the user to the second account associated with the user.

14. The non-transitory computer readable medium of claim 13, wherein the historical outgoing payments are historical electronic fund transfers from the first account associated with the first user to accounts associated with other users.

15. The non-transitory computer readable medium of claim 13, wherein the transaction indication is an electronic fund transfer request, received from the user computing device, for an electronic fund transfer from the first account associated with the first user to a third account associated with a second user.

16. The non-transitory computer readable medium of claim 13, wherein the historical outgoing payments correspond to card-based transactions, wherein the information associated with the historical outgoing payments comprises at least one selected from:

merchant category codes (MCCs) associated with the card-based transactions;

merchant identifiers associated with the card-based transactions;

locations associated with the card-based transactions; and combinations thereof.

17. The non-transitory computer readable medium of claim 16, wherein the transaction indication is an indication corresponding to a card-based transaction, and wherein the transaction indication comprises at least one of:

an MCC associated with the card-based transaction;

a merchant identifier associated with the card-based transaction; or a location associated with the card-based transaction.

18. The non-transitory computer readable medium of claim 13, wherein the information associated with the historical account transfers comprises an indication of source accounts, destination accounts, and transfer values associated with the historical account transfers.

* * * * *